United States Patent
Choi et al.

(10) Patent No.: US 10,727,502 B2
(45) Date of Patent: Jul. 28, 2020

(54) COMPOSITE MEMBRANE INCLUDING ION-CONDUCTIVE POLYMER LAYER AND GAS BLOCKING INORGANIC PARTICLES, METHOD OF PREPARING THE SAME, AND LITHIUM AIR BATTERY INCLUDING THE SAME

(71) Applicant: Samsung Electronics Co., Ltd., Suwon-si, Gyeonggi-do (KR)

(72) Inventors: Wonsung Choi, Yongin-si (KR); Hyunjin Kim, Suwon-si (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 153 days.

(21) Appl. No.: 15/646,239

(22) Filed: Jul. 11, 2017

(65) Prior Publication Data

US 2018/0040904 A1    Feb. 8, 2018

(30) Foreign Application Priority Data

Aug. 2, 2016 (KR) .................. 10-2016-0098451

(51) Int. Cl.
*H01M 8/0228* (2016.01)
*H01M 2/16* (2006.01)
(Continued)

(52) U.S. Cl.
CPC ......... *H01M 8/0228* (2013.01); *C08J 5/2225* (2013.01); *C08J 5/2231* (2013.01); *H01M 2/145* (2013.01); *H01M 2/166* (2013.01); *H01M 2/1646* (2013.01); *H01M 2/1653* (2013.01); *H01M 2/1686* (2013.01); *H01M 2/18* (2013.01); *H01M 8/0215* (2013.01); *H01M 8/0221* (2013.01); *H01M 10/0525* (2013.01);
(Continued)

(58) Field of Classification Search
CPC .. H01M 2/145; H01M 2/1646; H01M 2/1653; H01M 2/166; H01M 2/1686; H01M 2/18; H01M 10/0525; H01M 12/08; C08J 5/2225; C08J 5/2231
USPC .................................................. 429/251, 405
See application file for complete search history.

(56) References Cited

U.S. PATENT DOCUMENTS 4,247,499 A * 1/1981 Glugla .................... B29C 70/64
                                                                264/104
8,182,943 B2    5/2012 Visco et al.
(Continued)

FOREIGN PATENT DOCUMENTS

EP    3012885 A1 * 4/2016 ............ H01M 2/166
EP    3041066 A1    7/2016
(Continued)

OTHER PUBLICATIONS

Wikipedia contributors. "Natural number." Wikipedia, The Free Encyclopedia. Wikipedia, The Free Encyclopedia, Apr. 4, 2019. Web. Apr. 18, 2019. (Year: 2019).*
(Continued)

*Primary Examiner* — Sean P Cullen
(74) *Attorney, Agent, or Firm* — Cantor Colburn LLP

(57) ABSTRACT

A composite membrane includes an ion-conductive polymer layer; and a plurality of gas blocking inorganic particles non-continuously aligned on the ion-conductive polymer layer, wherein the composite membrane has a radius of curvature of about 10 millimeters or less.

25 Claims, 9 Drawing Sheets

(51) Int. Cl.
*H01M 2/18* (2006.01)
*H01M 10/0525* (2010.01)
*C08J 5/22* (2006.01)
*H01M 2/14* (2006.01)
*H01M 8/0215* (2016.01)
*H01M 8/0221* (2016.01)
*H01M 12/08* (2006.01)

(52) U.S. Cl.
CPC ......... *H01M 12/08* (2013.01); *C08J 2327/16* (2013.01); *C08J 2339/00* (2013.01); *H01M 2220/20* (2013.01)

(56) References Cited

U.S. PATENT DOCUMENTS

| | | | |
|---|---|---|---|
| 8,293,398 | B2 | 10/2012 | Visco et al. |
| 8,334,075 | B2 | 12/2012 | Visco et al. |
| 8,334,975 | B1 | 12/2012 | Cook |
| 8,501,339 | B2 | 8/2013 | Visco et al. |
| 8,623,557 | B2 | 1/2014 | Skotheim et al. |
| 8,652,686 | B2 | 2/2014 | Visco et al. |
| 8,728,661 | B2 | 5/2014 | Skotheim et al. |
| 2006/0046138 | A1* | 3/2006 | Hennige ............ C04B 38/0022 429/142 |
| 2008/0118826 | A1* | 5/2008 | Shimamura ............ H01M 6/48 429/129 |
| 2009/0136830 | A1* | 5/2009 | Gordon ............ H01M 10/052 429/50 |
| 2014/0017576 | A1 | 1/2014 | Kim et al. |
| 2015/0079485 | A1 | 3/2015 | Choi et al. |
| 2015/0255767 | A1* | 9/2015 | Aetukuri ............ H01M 8/1048 429/249 |
| 2016/0064785 | A1 | 3/2016 | Kim et al. |
| 2016/0099453 | A1* | 4/2016 | Anandan ............ H01M 2/18 429/142 |
| 2016/0181585 | A1 | 6/2016 | Choi et al. |
| 2017/0093002 | A1* | 3/2017 | Choi ............ H01M 2/1673 |

FOREIGN PATENT DOCUMENTS

| | | | |
|---|---|---|---|
| JP | 2003132907 A | * | 5/2003 |
| JP | 2008021416 A | * | 1/2008 |
| JP | 2013218786 A | | 10/2013 |
| JP | 2014044820 A | | 3/2014 |
| KR | 1020130046247 | | 5/2013 |
| KR | 20140015700 A | | 2/2014 |
| KR | 1020160025287 A | | 3/2016 |
| KR | 1020160075292 A | | 6/2016 |
| WO | WO-2015086759 A1 * | 6/2015 | ............ H01M 2/145 |
| WO | WO-2015110333 A1 * | 7/2015 | ............ H01M 2/1646 |

OTHER PUBLICATIONS

European Search Report for European Patent Application No. 17177156.1 dated Sep. 13, 2017.

* cited by examiner

COMPOSITE MEMBRANE INCLUDING ION-CONDUCTIVE POLYMER LAYER AND GAS BLOCKING INORGANIC PARTICLES, METHOD OF PREPARING THE SAME, AND LITHIUM AIR BATTERY INCLUDING THE SAME

CROSS-REFERENCE TO RELATED APPLICATION

This application claims the benefit of and priority to Korean Patent Application No. 10-2016-0098451, filed on Aug. 2, 2016, in the Korean Intellectual Property Office, and all the benefits accruing therefrom under 35 U.S.C. § 119, the content of which is incorporated herein in its entirety by reference.

BACKGROUND

1. Field

The present disclosure relates to a composite membrane, a method of preparing the composite membrane, and a lithium air battery including the composite membrane.

2. Description of the Related Art

A lithium air battery includes an anode, a cathode that uses oxygen in the air as a cathode active material and includes a catalyst for oxidizing and reducing oxygen, and a lithium ion-conductive medium between the cathode and the anode.

Lithium air batteries have a theoretical energy density of about 3,000 watt hours per kilogram (Wh/kg) or greater, which is remarkably higher than that of lithium ion batteries. Furthermore, lithium air batteries are more environmentally friendly and safer in use than lithium ion batteries. To improve the cell performance of such a lithium air battery, there is a need for an improved separator with the ability to effectively block moisture and gas while also enabling lithium ions to pass through.

SUMMARY

Provided is a composite membrane and a method of preparing the composite membrane.

Provided is a lithium air battery with improved cell performance including the composite membrane.

Additional aspects will be set forth in part in the description which follows and, in part, will be apparent from the description, or may be learned by practice of the presented embodiments.

According to an aspect, a composite membrane includes: an ion-conductive polymer layer; and a plurality of gas blocking inorganic particles non-continuously disposed on the ion-conductive polymer layer, wherein the composite membrane has a radius of curvature of about 10 millimeters or less.

According to an aspect, a method of preparing the composite membrane includes: preparing a composition including the ion-conductive polymer and an organic solvent; disposing the composition onto a porous substrate; applying the plurality of gas blocking inorganic particles to the composition; and drying the gas blocking inorganic particles and the composition to prepare the composite membrane.

According to an aspect of another example embodiment, a lithium air battery includes an anode, a cathode, and the composite membrane between the anode and the cathode.

According to an aspect, a battery assembly includes an electrolyte; a lithium metal or a lithium metal alloy; and the composite membrane.

BRIEF DESCRIPTION OF THE DRAWINGS

These and/or other aspects will become apparent and more readily appreciated from the following description of the example embodiments, taken in conjunction with the accompanying drawings in which.

DETAILED DESCRIPTION

Figure 1A:
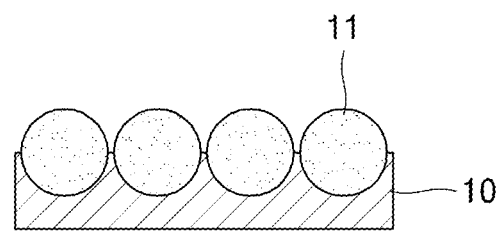
FIG. 1A is a schematic perspective view of an embodiment of a composite membrane.

Reference will now be made in detail to an embodiment of a composite membrane, a method of preparing the composite membrane, and a lithium air battery including the composite membrane, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be understood that when an element is referred to as being "on" another element, it can be directly on the other element or intervening elements may be present therebetween. In contrast, when an element is referred to as being "directly on" another element, there are no intervening elements present.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

According to an aspect of the present disclosure, a composite membrane includes an ion-conductive polymer layer and a plurality of gas blocking inorganic particles non-continuously aligned on the ion-conductive polymer layer, wherein the composite membrane has a radius of curvature of about 10 millimeters (mm) or less.

In an embodiment, the composite membrane may have a radius of curvature of about 5 mm or less, about 4 mm or less, about 3 mm or less, about 2 mm or less, about 1.8 mm or less, about 1.6 mm or less, about 1.4 mm or less, about 1.2 mm or less, about 1 mm or less, about 0.9 mm or less, about 0.8 mm or less, about 0.7 mm or less, about 0.6 mm or less, about 0.5 mm or less, about 0.4 mm or less, about 0.3 mm or less, about 0.2 mm or less, or about 0.1 mm or less, and in another embodiment, about 0.1 mm to about 5 mm, about 0.1 mm to about 4 mm, about 0.1 mm to about 3 mm, about 0.1 mm to about 2 mm, about 0.1 mm to about 1 mm, about 0.2 mm to about 1 mm, about 0.3 mm to about 1 mm, about 0.4 mm to about 1 mm, about 0.5 mm to about 1 mm, about 0.6 mm to about 1 mm, about 0.7 mm to about 1 mm, about 0.8 mm to about 1 mm, about 0.9 mm to about 1 mm, about 1 mm to about 2 mm, about 1.2 mm to about 2 mm, about 1.4 mm to about 2 mm, about 1.6 mm to about 2 mm, about 1.8 mm to about 2 mm, about 2 mm to about 2.2 mm, about 2 mm to about 2.4 mm, about 2 mm to about 2.6 mm, about 2 mm to about 2.8 mm, about 2 mm to about 3 mm, about 2 mm to about 4 mm, about 3 mm to about 4 mm, or about 2 mm to about 5 mm, and thus may have improved flexibility. Accordingly, the composite membrane may be used in a foldable battery.

As used herein, the term "radius of curvature" may refer to a radius of a circle formed by bending a film, e.g., the composite membrane. A greater radius of curvature indicates a lesser degree of bending, and a lesser radius of curvature indicates a greater degree of bending. The smaller a radius of curvature is, the greater the flexibility of a composite membrane may be. In geometric terms, the term "the radius of curvature" refers to a radius of a circle, the curvature of which is equal to that of a curve at a given point. A larger radius of curvature means a lesser degree of curvature and a smaller radius of curvature means a greater degree of curvature.

Figure 3A:
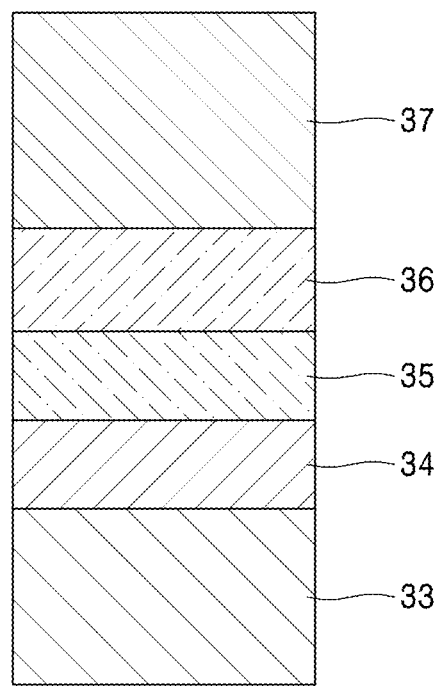
FIG. 3A is a schematic cross-sectional view illustrating a structure of an embodiment of a lithium air battery.

A radius of curvature limit may refer to a radius of curvature at a maximum degree of bending that a material can sustain, for example a maximum degree of curvature. FIG. 3C is a perspective view illustrating the radius of curvature R of a composite membrane 100 according to an embodiment. The composite membrane 100 may have a limit of a radius of curvature R of about 5 mm or less, about 4 mm or less, about 3 mm or less, about 2 mm or less, about 1.8 mm or less, about 1.6 mm or less, about 1.4 mm or less, about 1.2 mm or less, about 1 mm or less, about 0.9 mm or less, about 0.8 mm or less, about 0.7 mm or less, about 0.6 mm or less, about 0.5 mm or less, about 0.4 mm or less, about 0.3 mm or less, about 0.2 mm or less, or about 0.1 mm or less, and may be about 0.1 mm to about 5 mm, about 0.1 mm to about 4 mm, about 0.1 mm to about 3 mm, about 0.1 mm to about 2 mm, about 0.1 mm to about 1 mm, about 0.2 mm to about 1 mm, about 0.3 mm to about 1 mm, about 0.4 mm to about 1 mm, about 0.5 mm to about 1 mm, about 0.6 mm to about 1 mm, about 0.7 mm to about 1 mm, about 0.8 mm to about 1 mm, about 0.9 mm to about 1 mm, about 1 mm to about 2 mm, about 1.2 mm to about 2 mm, about 1.4 mm to about 2 mm, about 1.6 mm to about 2 mm, about 1.8 mm to about 2 mm, about 2 mm to about 2.2 mm, about 2 mm to about 2.4 mm, about 2 mm to about 2.6 mm, about 2 mm to about 2.8 mm, about 2 mm to about 3 mm, about 2 mm to about 4 mm, about 3 mm to about 4 mm, or about 2 mm to about 5 mm. The radius of curvature limit refers to a radius of curvature when the composite membrane has a maximum degree of bending, for example a maximum degree of curvature. When the limit of the radius of curvature R of the composite membrane 100 is within this range, there is effectively no limitation in bending when used a battery including the composite membrane. In other words, the radius of curvature limit refers to a radius of curvature when the composite membrane has a maximum degree of bending.

A composite membrane according to an embodiment of the present disclosure may have an improved oxygen blocking ability, reduced weight, and improved energy density per weight, as compared with a polymer electrolyte for a lithium air battery.

The composite membrane may include a sea-island structure of discontinuously aligned gas blocking inorganic particles in a continuous ion-conductive polymer layer, or an alternately aligned structure in which the gas blocking inorganic particles are aligned to alternate with ion-conductive polymer layers in a horizontal cross-section of the composite membrane.

In an embodiment, as illustrated in FIG. 1A, the composite membrane may have a structure in which the gas blocking inorganic particles 11 are disposed, e.g., aligned, on a surface of the ion-conductive polymer layer 10. In this structure, the gas blocking inorganic particles 11 may be non-continuously disposed so that the individual gas blocking inorganic particles 11 are separated from each other on the ion-conductive polymer layer 10, preventing the formation of an agglomeration of the gas blocking inorganic particles 11. The agglomeration of gas blocking inorganic particles 11 is undesirable because the agglomerate may increase the electrical resistance and reduce lithium ion conductivity of the composite membrane. As illustrated in FIG. 1A, the gas blocking inorganic particles 11 may be aligned in a substantially horizontal direction on the ion-conductive polymer layer 10. In an embodiment, at least a portion of the surface of at least one of the gas blocking inorganic particles 11 is not surrounded by the ion-conductive polymer layer 10.

A lithium air battery manufactured using the composite membrane may have a structure in which the gas blocking inorganic particles are disposed in a region of the composite membrane adjacent to a cathode of the lithium air battery. Without being bound by theory, when a lithium air battery has such a structure, reaction of lithium in a lithium anode with the gas blocking inorganic particles may be effectively suppressed even when the gas blocking inorganic particles are reactive with lithium, and thus the composite membrane may serve as a protective layer for the lithium anode and as an effective gas blocking layer.

Figure 1B:
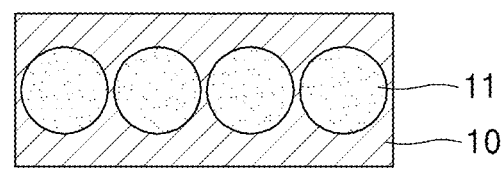
FIG. 1B is a schematic perspective view of another embodiment of a composite membrane.

Referring to FIG. 1B, the composite membrane may have a structure in which the gas blocking inorganic particles 11 are disposed within the ion-conductive polymer layer 10. In this structure, the gas blocking inorganic particles 11 may be non-continuously disposed so that the individual gas blocking inorganic particles 11 may be separated from each other, e.g., spaced apart from each other, in the ion-conductive polymer layer 10, preventing and/or reducing the formation of an agglomeration of gas blocking inorganic particles, which can result in resistance against lithium ion conduction. In an embodiment, at least one of the gas blocking inorganic particles 11 is substantially enclosed within the ion-conductive polymer layer 10 such that the gas blocking inorganic particle 11 is surrounded by the ion-conductive polymer layer 10.

In a lithium air battery, when external oxygen reaches the lithium metal through a cathode and an electrolyte, a lithium oxide ($LiO_2$ or $Li_2O_2$) may be produced so as to remarkably reduce a lifetime of the lithium air battery.

To address this drawback, a composite membrane according to an embodiment may be disposed between a cathode electrolyte and an anode electrolyte, e.g., between a cathode and an anode, as a gas blocking layer. This arrangement of the composite membrane may improve the lifetime of the lithium air battery. The composite membrane may be lightweight and flexible, have improved ion conductivity, and have a large size. Due to the arrangement of the composite membrane, the gas blocking inorganic particle 11 may be effective in blocking the oxygen coming from the cathode, thereby protecting the anode.

In an example embodiment, the gas blocking inorganic particle 11 may have a hydrophobic coating layer on at least one surface thereof. The hydrophobic coating layer may be a continuous coating layer or a non-continuous coating layer inclusive of an island shaped coating layer. When the gas blocking inorganic particle 11 has a hydrophobic coating layer on at least one surface thereof, the gas blocking inorganic particles in a non-continuously aligned arrangement may be effectively formed without agglomeration of the gas blocking inorganic particles. In other words, the hydrophobic coating layer on at least one surface of the gas inorganic particles may reduce or eliminate agglomeration of the gas blocking inorganic particles.

The hydrophobic coating layer on at least one surface of the gas blocking inorganic particles may be identified by X-ray photoelectron spectroscopy (XPS), for example, from the presence of the Si 2p and C 1s peaks in XPS spectra.

The hydrophobic coating layer may comprise, and in an embodiment consist of, a condensation reaction product of at least one selected from compounds represented by Formula 1.

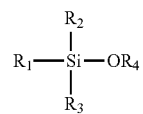

Formula 1

In Formula 1, $R_1$ to $R_3$ may each independently be selected from a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C7-C20 arylalkyl group, a substituted or unsubstituted C6-C20 aryloxy group, a substituted or unsubstituted C2-C20 heteroaryl group, a substituted or unsubstituted C2-C20 heteroaryloxy group, a substituted or unsubstituted C3-C20 heteroarylalkyl group, a substituted or unsubstituted C2-C20 heterocyclic group, and a halogen atom; and $R_4$ may be selected from hydrogen, a substituted or unsubstituted C1-C20 alkyl group, and a substituted or unsubstituted C6-C20 aryl group.

For example, $R_1$ to $R_3$ may each independently be selected from methyl, ethyl, butyl, isobutyl, octyl, methoxy, ethoxy, octadecyl, 3-methacryloxypropyl, decyl, propyl, and chlorine. For example, $R_4$ may be selected from methyl, ethyl, butyl, propyl, isobutyl, and octyl.

For example, the compound represented by Formula 1 may include at least one compound selected from isobutyltrimethoxysilane, octyltrimethoxysilane, propyltrimethoxysilane, decyltrimethoxysilane, dodecyltrimethoxysilane, octadecyltrimethoxysilane, 3-methacryloxypropyltrimethoxysilane, n-octadecyltriethoxysilane, 1H,1H,2H,2H-perfluorooctyltriethoxysilane (PFO), and (3-mercaptopropyl)trimethoxysilane.

An alignment of the gas blocking inorganic particles in the composite membrane may vary depending on the composition of the hydrophobic coating layer.

For example, when the hydrophobic coating layer includes a condensation product of exclusively PFO, the composite membrane may have a structure as illustrated in FIG. 1B in which the gas blocking inorganic particles are present within the ion-conductive polymer layer 10.

For example, when the hydrophobic coating layer includes a condensation product that is derived from a mixture of PFO and (3-mercaptopropyl)trimethoxysilane, unlike when the hydrophobic coating layer includes a condensation product derived from only PFO, e.g., without (3-mercaptopropyl)trimethoxysilane, the composite membrane may have a structure as illustrated in FIG. 1A in which the gas blocking inorganic particles 11 are present on the upper surface of the composite membrane.

For example, an amount of the condensation reaction product of at least one of the compounds represented by Formula 1 in the hydrophobic coating layer may be from about 0.1 parts to about 30 parts by weight, based on 100 parts by weight of the gas blocking inorganic particles, and in an embodiment, from about 0.1 parts to about 10 parts by weight, and in another embodiment, from about 0.1 parts to about 5 parts by weight, based on 100 parts by weight of the gas blocking inorganic particles.

In an embodiment, the gas blocking inorganic particles in the ion-conductive polymer layer may be non-continuously aligned as a monolayer, for example on the surface of ion-conductive polymer layer or within the ion-conductive polymer layer. The gas blocking inorganic particles may be in a single-particle state and without a grain boundary. Accordingly, no grain boundary may be observed in the gas blocking inorganic particles. The ion-conductive polymer layer may be a dense layer having non-porous characteristics.

When a composite membrane according to any of the above-described embodiments is used as a gas barrier membrane blocking moisture or gas (for example, oxygen or carbon dioxide) in a lithium air battery, ions (for example, lithium ions) may pass through the ion-conductive polymer layer including the gas blocking inorganic particles, while moisture or gas (for example, oxygen or carbon dioxide) may be blocked by the ion-conductive polymer layer.

In an embodiment, the gas blocking inorganic particles in the composite membrane may occupy about 70% or more of a total area of the composite membrane, for example, about 70% to about 99%, about 70% to about 90%, or about 70% to about 80% of a total area of the composite membrane, where the percentage of the total area of the composite membrane occupied may be determined based on a percentage of the cross-sectional area of the composite membrane occupied by a projection of the gas blocking inorganic particles on the composite membrane. When the gas blocking inorganic particles occupy the cross-sectional area of the composite membrane within these ranges, the composite membrane may have an improved gas blocking ability.

As used herein, the term "gas" may be construed as meaning at least one selected from oxygen, carbon dioxide, moisture, and vapor, e.g., water vapor. For example, gas permeability may refer to, for example, oxygen permeability or moisture permeability.

The alignment of the gas blocking inorganic particles is not limited to alignments illustrated in the embodiments of FIGS. 1A and 1B.

The gas blocking inorganic particles may have any of a variety of suitable shapes, may be rectilinear or curvilinear, and may comprise for example, vertical and horizontal cross-sectional shapes, such as a circular shape, a triangular shape, a quasi-triangular shape, a triangular shape with semi-circles, a triangular shape with a rounded corner, a square shape, a rectangular shape, a rectangular shape with semi-circles, and a polygonal shape. For example, the gas blocking inorganic particles may have any of a variety of shapes, such as a cubic shape, a spherical shape, a circular shape, an elliptical shape, a rod shape, a stick shape, a tetrahedral shape, a pyramidal shape, an octahedral shape, a cylindrical shape, a polygonal shape, a pillar shape, a polygonal pillar-like shape, a conical shape, a columnar shape, a tubular shape, a helical shape, a funnel shape, a dendritic shape, or a bar shape.

The size of the gas blocking inorganic particles may refer to an average diameter thereof when the gas blocking inorganic particles have a spherical shape or a length of a major (longer) axis when the gas blocking inorganic particles have any other shapes.

In a lithium air battery, a ceramic material layer has been used for both the functions of ion conduction and oxygen blocking. However, a ceramic material layer has a high weight and a limited shape, and is difficult to form in a large size. Moreover, a ceramic material layer has a weak mechanical strength and is easily broken by external impacts, and weight or thickness reduction is limited. These drawbacks in using a ceramic material layer obstruct practical application.

In an embodiment, the composite membrane may have gas blocking inorganic particles non-continuously aligned without agglomeration of the gas blocking inorganic particles, as illustrated in FIGS. 1A and 1B. This structure may provide a migration path of lithium ions and ensures improved ion conductivity. Unlike a ceramic material, the composite membrane may also be formed as a thin film, and thus may have reduced electrical resistance and reduced weight, and may be formed in a large size. Furthermore, the composite membrane may have improved flexibility due to the inclusion of a polymer, improved processibility applicable to any suitable cell design, and improved mechanical strength. Compared to a ceramic material layer, the composite membrane may be prepared at lower cost. By using a composite membrane according to any of the embodiments disclosed herein, a large-area, thin-film, and lightweight lithium air battery having an improved lifetime may be manufactured through a process as described herein.

For example, the amount of the gas blocking inorganic particles may be from about 10 parts to about 90 parts by weight, and in an embodiment, about 20 parts to about 80 parts by weight, based on 100 parts by weight of a total weight of the composite membrane. When the amount of the gas blocking inorganic particles is within these ranges, the composite membrane may have improved ion conductivity and improved mechanical strength.

The gas blocking inorganic particles may further include at least one selected from a glassy active metal ionic conductor, an amorphous active metal ionic conductor, a ceramic active metal ionic conductor, and a glass-ceramic active metal ionic conductor.

In an embodiment, the gas blocking inorganic particles may comprise an oxide-based lithium ion-conductive solid ceramic electrolyte. For example, the gas blocking inorganic particles may be at least one selected from $Li_{1+x+y}Al_xTi_{2-x}Si_yP_{3-y}O_{12}$ (wherein 0<x<2 and 0≤y<3), $BaTiO_3$, $Pb(Zr_rTi_{1-r})O_3$ (PZT) (wherein 0≤r≤1), $Pb_{1-x}La_xZr_{1-y}Ti_yO_3$ (PLZT) (wherein 0≤x<1, and 0≤y<1), $Pb(Mg_3Nb_{2/3})O_3$—$PbTiO_3$ (PMN-PT), $HfO_2$, $SrTiO_3$, $SnO_2$, $CeO_2$, $Na_2O$, MgO, NiO, CaO, BaO, ZnO, $ZrO_2$, $Y_2O_3$, $Al_2O_3$, $TiO_2$, $SiO_2$, SiC, lithium phosphate ($Li_3PO_4$), lithium titanium phosphate ($Li_xTi_y(PO_4)_3$, wherein 0<x<2 and 0<y<3), lithium aluminum titanium phosphate ($Li_xAl_yTi_z(PO_4)_3$, wherein 0<x<2, 0<y<1, and 0<z<3), $Li_{1+x+y}(Al_qGa_{1-q})_x(Ti_hGe_{1-h})_{2-x}Si_yP_{3-y}O_{12}$ (wherein 0≤q≤1, 0≤h≤1, 0≤x≤1 and 0≤y≤1), lithium lanthanum titanate ($Li_xLa_yTiO_3$, wherein 0<x<2 and 0<y<3), lithium germanium thiophosphate ($Li_xGe_yP_zS_w$, wherein 0<x<4, 0<y<1, 0<z<1, and 0<w<5), lithium nitride glass ($Li_xN_y$, wherein 0<x<4 and 0<y<2), $SiS_2$ glass ($Li_xSi_yS_z$, wherein 0≤x<3, 0<y<2, and 0<z<4), $P_2S_5$ glass ($Li_xP_yS_z$, wherein 0≤x<3, 0<y<3, and 0<z<7), $Li_2O$, LiF, LiOH, $Li_2CO_3$, $LiAlO_2$, $Li_2O$—$Al_2O_3$—$SiO_2$—$P_2O_5$—$TiO_2$—$GeO_2$ ceramics, and Garnet ceramics ($Li_{3+x}La_3M_2O_{12}$, wherein M is Te, Nb, or Zr, and x is an integer from 1 to 10). An example of the Garnet ceramics may be $Li_7La_3Zr_2O_{12}$.

For example, the gas blocking inorganic particles may include $Li_{1.4}Ti_{1.6}Al_{0.4}P_3O_{12}$ (LTAP) or a $Li_2O$—$Al_2O_3$—$SiO_2$—$P_2O_5$—$TiO_2$—$GeO_2$ ceramic.

As described above, the gas blocking inorganic particles have substantially no grain boundary, which thus may ensure a lithium conduction path with a reduced electrical resistance in the composite membrane including the gas blocking inorganic particles. This may facilitate conduction and migration of lithium ions, and may also result in markedly improved lithium ion conductivity and lithium ion transference rate. Compared with a membrane including only inorganic particles, a composite membrane according to an embodiment may have improved flexibility and mechanical strength.

In an embodiment, the gas blocking inorganic particles may be in the form of a single-particle state without a grain boundary, which may be identified by scanning electron microscopy (SEM).

For example, the gas blocking inorganic particles may have an average particle diameter of about 1 micrometer (μm) to about 300 μm, and in an example embodiment, about 1 μm to about 200 μm, and in another example embodiment, about 1 μm to about 150 μm, or about 1 μm to about 100 μm, or about 1 μm to about 90 μm, or about 1 μm to about 80 μm, or about 1 μm to about 70 μm, or about 1 μm to about 60 μm, or about 1 μm to about 50 μm, or about 1 μm to about 40 μm, or about 1 μm to about 30 μm, or about 1 μm to about 20 μm, or about 1 μm to about 10 μm. In another embodiment, the gas blocking inorganic particles may have an average particle diameter of less than about 300 μm, or less than about 200 μm, or less than about 150 μm, or less than about 100 μm, or less than about 90 μm, or less than about 80 μm, or less than about 70 μm, or less than about 60 μm, or less than about 50 μm, or less than about 40 μm, or less than about 30 μm, or less than about 20 μm, or less than about 10 μm. When the gas blocking inorganic particles have an average particle diameter within these ranges, the composite membrane including the gas blocking inorganic particles may be prepared in a single-particle state without a grain boundary through, for example, a grinding process.

The particle sizes of the gas blocking inorganic particles may be substantially uniform, which may be maintained in the composite membrane. For example, the gas blocking inorganic particles may have a D50 of about 110 μm to about 130 μm, a D90 of about 180 μm to about 200 μm, and a D10 of about 60 μm to about 80 μm. The terms "D50", "D10", and "D90" refer to a particle diameter of 50 volume %, 10 volume %, and 90 volume %, respectively, in a cumulative distribution curve of particle sizes (particle diameters).

The ion-conductive polymer layer of the composite membrane may include a polymer having barrier characteristics rendering it capable of blocking at least one selected from oxygen and moisture, as well as anode corrosive gases. The anode corrosive gases may be, for example, vapor, carbon dioxide, or oxygen. Therefore, the composite membrane including the ion-conductive polymer layer may also serve as an oxygen barrier membrane, a moisture blocking membrane, or a carbon dioxide barrier membrane.

For example, the polymer of the ion-conductive polymer layer may include at least one selected from polyethylene oxide, polyvinylidene fluoride, polyvinylpyrrolidone, polyvinyl alcohol, poly 2-vinylpyridine, polytetrafluoroethylene, a tetrafluoroethylene-hexafluoropropylene copolymer, polychlorotrifluoroethylene, a perfluoroalkoxy copolymer, a fluorinated cyclic ether, polyethylene oxide diacrylate, polyethylene oxide dimethacrylate, polypropylene oxide diacrylate, polypropylene oxide dimethacrylate, polymethyleneoxide diacrylate, polymethyleneoxide dimethacrylate, poly (C1-C4 alkyldiol) diacrylate, poly(C1-C4 alkyl)diol dimethacrylate, polydivinylbenzene, polyether, polycarbonate, polyamide, polyester, polyvinyl chloride, polyimide, polycarboxylic acid, polysulfonic acid, polysulfone, polystyrene, polyethylene, polypropylene, poly(p-phenylene), polyacetylene, poly(p-phenylene vinylene), polyaniline, polypyrrole, polythiophene, polyacene, poly(naphthalene-2, 6-diyl), polypropylene oxide, a vinylidene fluoride-hexafluoropropylene copolymer, poly(vinyl acetate), poly (vinyl butyral-co-vinyl alcohol-co-vinyl acetate), poly (methyl methacrylate-co-ethyl acrylate), polyacrylonitrile, polyvinyl chloride-co-vinyl acetate, poly(1-vinyl pyrrolidone-co-vinyl acetate), poly(C1-C6 alkyl)acrylate, poly(C1-C6 alkyl)methacrylate, polyurethane, polyvinyl ether, an acrylonitrile-butadiene rubber, a styrene-butadiene rubber, an acrylonitrile-butadiene-styrene rubber, a sulfonated styrene/ethylene-butylene triblock copolymer, epoxide resin, and a polymer obtained from at least one acrylate monomer selected from ethoxylated neopentyl glycol diacrylate, ethoxylated bisphenol A diacrylate, a C10-C30 alkyl acrylate, ethoxylated aliphatic urethane acrylate, and ethoxylated C2-C20 alkylphenol acrylate.

In a composite membrane according to an embodiment, the amount of the polymer in the ion-conductive polymer layer may be from about 10 parts to about 80 parts by weight, and in another example embodiment, about 50 parts to about 80 parts by weight, based on 100 parts by weight of a total weight of the composite membrane. When the amount of the polymer in the ion-conductive polymer is within these ranges, the composite membrane may have improved lithium ion conductivity, flexibility, and gas blocking ability without deterioration in film formability.

The ion-conductive polymer may have a weight average molecular weight of about 10,000 to about 300,000 Daltons, as measured by gel permeation chromatography (GPC), e.g., using a polystyrene standard. When the polymer has a weight average molecular weight within this range, the composite membrane may have improved ion conductivity and improved gas and moisture blocking ability without deterioration in film formability.

In an embodiment, the composite membrane may include the gas blocking inorganic particles with a high density, and thus may have reduced electrical resistance.

For example, the composite membrane may have a weight of about 5 milligrams per square centimeter ($mg/cm^2$) to about 20 $mg/cm^2$, and in another embodiment, about 11 $mg/cm^2$ to about 16 $mg/cm^2$. When the composite membrane has a weight within these ranges, a thin-film, light-weight lithium air battery may be manufactured using the composite membrane.

For example, the composite membrane may have a thickness of about 10 μm to about 200 μm, and in another embodiment, a thickness of about 70 μm to about 100 μm. When the composite membrane has a thickness within these ranges, the composite membrane may have improved ion conductivity and improved moisture and gas blocking ability.

In an embodiment, the composite membrane may further include a porous layer, for example a layer comprising a porous substrate. The porous substrate may be any suitable porous material including pores and having suitable mechanical and heat-resistance characteristics. Examples of the porous substrate are sheets or nonwoven fabric including an olefin-based polymer, glass fiber, or polyethylene having suitable chemical resistance and hydrophobic characteristics. Examples of the olefin-based polymer include at least one selected from polyethylene and polypropylene.

For example, the porous layer may be a mixed multi-layer, such as a two-layered polyethylene/polypropylene separator, a three-layered polyethylene/polypropylene/polyethylene separator, or a three-layered polypropylene/polyethylene/polypropylene separator. For example, the porous layer may include a polyethylene layer or a polypropylene layer. The porous substrate may have a pore diameter of about 0.01 μm to about 10 μm, and a thickness of about 5 μm to about 35 μm. The porous layer may further include a liquid electrolyte including a lithium salt and an organic solvent.

In an embodiment, the composite membrane may further include at least one selected from a lithium salt, an ionic liquid, and a polymeric ionic liquid.

The amount (concentration) of the lithium salt may be from about 0.01 moles per liter (molar, M) to about 5 M, and in another embodiment, from about 0.2 M to about 2.0 M. When the amount of the lithium salt is within these ranges, the composite membrane may have improved conductivity.

The lithium salt may serve as a source of lithium ions in a battery by being dissolved in a solvent. The lithium salt may be at least one selected from $LiPF_6$, $LiBF_4$, $LiSbF_6$, $LiAsF_6$, $LiN(SO_2C_2F_5)_2$, $Li(CF_3SO_2)_2N$, $Li(FSO_2)_2N$, $LiC_4F_9SO_3$, $LiClO_4$, $LiAlO_2$, $LiAlCl_4$, $LiN(C_xF_{2x+1}SO_2)$ $(C_yF_{2y+1}SO_2)$ (wherein x and y are natural numbers), LiF, LiBr, LiCl, LiOH, LiI, and $LiB(C_2O_4)_2$ (LiBOB; lithium bis(oxalato) borate).

In an embodiment, the composite membrane may further include at least one selected from an ionic liquid and a polymeric ionic liquid, in addition to a lithium salt as described above.

An ionic liquid refers to a salt in a liquid state at room temperature or a fused salt at room temperature that includes ions having a melting point equal to or less than room temperature. The ionic liquid may be at least one selected from compounds each including i) a cation of at least one selected from an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, and a triazolium cation; and ii) at least one anion selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $(FSO_2)_2N^-$, $Cl^-$, $Br^-$, $I^-$, $SO_4^-$, $CF_3SO_3^-$, $(C_2F_5SO_2)_2N^-$, and $(C_2F_5SO_2)(CF_3SO_2)N^-$.

Examples of the ionic liquid may be compounds including at least one cation of a linear or branched substituted ammonium, imidazolium, pyrrolidinium, pyridinium, and piperidinium; and at least one anion selected from $PF_6^-$, $BF_4^-$, $CF_3SO_3^-$, $(CF_3SO_2)_2N^-$, $(C_2F_5SO_2)_2N^-$, $(FSO_2)_2N^-$, and $(CN)_2N^-$.

For example, the ionic liquid may comprise at least one selected from N,N-diethyl-N-methyl-N-(2-methoxyethyl) ammonium bis(trifluoromethanesulfonyl)imide, N-methyl-N-propylpyrrolidinium bis(trifluoromethanesulfonyl)imide, N-butyl-N-methylpyrrolidinium bis(trifluoromethanesulfonyl)imide, 1-butyl-3-methylimidazolium bis(trifluoromethanesulfonyl)imide, and 1-ethyl-3-methylimidazolium bis(trifluoromethanesulfonyl)imide.

For example, the polymeric ionic liquid may comprise, for example, a polymerization product of ionic liquid monomers, or a polymeric compound. The polymeric ionic liquid is highly soluble in an organic solvent, and thus may further improve the ionic conductivity of the electrolyte when added.

When the ionic liquid is a polymeric ionic liquid obtained by polymerization of ionic liquid monomers as described above, a resulting product from the polymerization reaction may be washed and dried, followed by an anionic substitution reaction to prepare an appropriate composite membrane that may improve solubility in an organic solvent.

In an embodiment, the polymeric ionic liquid may include a repeating unit that includes i) a cation of at least one selected from an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, and a triazolium cation; and ii) at least one anion selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $(FSO_2)_2N^-$, $Cl^-$, $Br^-$, $I^-$, $SO_4^-$, $CF_3SO_3^-$, $(C_2F_5SO_2)_2N^-$, $(C_2F_5SO_2)(CF_3SO_2)N^-$, $NO_3^-$, $Al_2Cl_7^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, and $(O(CF_3)_2C_2(CF_3)_2O)_2PO^-$.

In another embodiment, the polymeric ionic liquid may be prepared by polymerization of ionic liquid monomers. The ionic liquid monomers may have a polymerizable functional group such as at least one selected from a vinyl group, an allyl group, an acrylate group, and a methacrylate group, and may include a cation of at least one selected from an ammonium cation, a pyrrolidinium cation, a pyridinium cation, a pyrimidinium cation, an imidazolium cation, a piperidinum cation, a pyrazolium cation, an oxazolium cation, a pyridazinium cation, a phosphonium cation, a sulfonium cation, and a triazolium cation, and at least one of the above-listed anions.

Non-limiting examples of the ionic liquid monomers are 1-vinyl-3-ethylimidazolium bromide, a compound represented by Formula 5, and a compound represented by Formula 6.

Formula 5

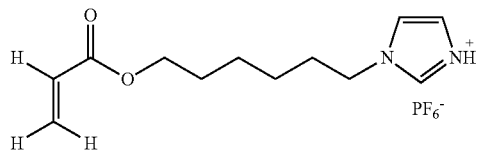

Formula 6

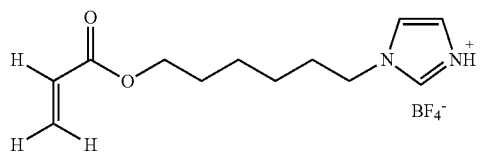

For example, the polymeric ionic liquid may be a compound represented by Formula 7 or a compound represented by Formula 8.

Formula 7

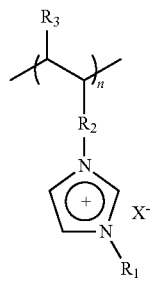

In Formula 7, $R_1$ and $R_3$ may each independently be selected from a hydrogen, a substituted or unsubstituted C1-C30 alkyl group, a substituted or unsubstituted C2-C30 alkenyl group, a substituted or unsubstituted C2-C30 alkynyl group, a substituted or unsubstituted C6-C30 aryl group, a substituted or unsubstituted C2-C30 heteroaryl group, and a substituted or unsubstituted C4-C30 carbocyclic group; $R_2$ may be selected from a chemical bond, a C1-C30 alkylene group, a C6-C30 arylene group, a C2-C30 heteroarylene group, and a divalent C4-C30 carbocyclic group; $X^-$ indicates an anion of the polymeric ionic liquid; and n may be a number from about 500 to about 2800.

Formula 8

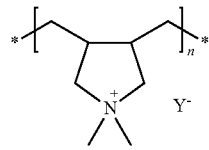

In Formula 8, $Y^-$ may be defined the same as $X^-$ in Formula 7; and n may be a number from about 500 to about 2800. For example, in Formula 8, $Y^-$ may be selected from bis(trifluoromethanesulfonyl)imide (TFSI), $BF_4$, and $CF_3SO_3$.

The polymeric ionic liquid may include, for example, at least one cation selected from poly(1-vinyl-3-alkylimidazolium), poly(1-allyl-3-alkylimidazolium), and poly(1-(methacryloyloxy-3-alkylimidazolium), and at least one anion selected from $CH_3COO^-$, $CF_3COO^-$, $CH_3SO_3^-$, $CF_3SO_3^-$, $(CF_3SO_2)_2N^-$, $(FSO_2)_2N^-$, $(CF_3SO_2)_3C^-$, $(CF_3CF_2SO_2)_2N^-$, $C_4F_9SO_3^-$, $C_3F_7COO^-$, and $(CF_3SO_2)(CF_3CO)N^-$.

For example, the compound represented by Formula 8 may be polydiallyldimethyl ammonium bis(trifluoromethanesulfonyl)imide.

For example, the polymeric ionic liquid may be at least one selected from poly(diallyldimethylammonium) bis(trifluoromethanesulfonyl)imide (TFSI), poly(1-methacryloyloxy propyl-3-methylimidazolium) bis(trifluoromethanesulfonyl) imide), and poly(1-vinyl-3-ethylimidazolium) bis(trifluoromethanesulfonyl) imide).

In another embodiment, the polymeric ionic liquid may include a low-molecular weight polymer, a thermally stable ionic liquid, and a lithium salt. The low-molecular weight polymer may have an ethylene oxide chain. The low-molecular weight polymer may be a glyme. Non-limiting examples of the glyme may be at least one selected from polyethylene glycol dimethylether (polyglyme), tetraethylene glycol dimethyl ether (tetraglyme), and triethylene glycol dimethylether (triglyme).

For example, the low-molecular weight polymer may have a weight average molecular weight of about 75 to about 2000 Daltons (Da), and in another embodiment, about 250 to about 500 Da. The thermally stable ionic liquid may be defined the same as any of the ionic liquids described above.

Hereinafter, a method of preparing a composite membrane, according to an example embodiment, will be described.

An ion-conductive polymer and an organic solvent may be mixed to prepare an ion-conductive layer forming composition. At least one selected from a lithium salt, an ionic liquid, and a polymeric ionic liquid may be further added to the ion-conductive layer forming composition.

Figure 2:
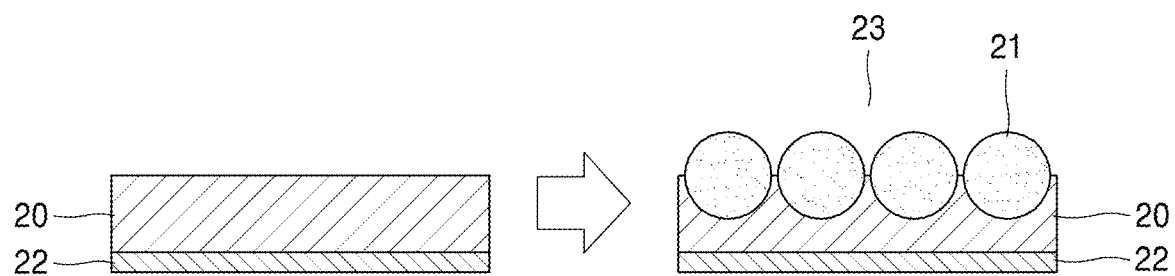
FIG. 2 is a schematic illustration for explaining an embodiment of a method of preparing a composite membrane.

Referring to FIG. 2, an ion-conductive polymer layer 20 in a liquid state, for example dissolved in or mixed with an organic solvent, may be on a separator 22. The ion-conductive polymer layer 20 in a liquid state may be formed by applying the ion-conductive polymer layer forming composition and then the gas blocking inorganic particles 21 onto the separator 22. The gas blocking inorganic particles 21 may be particles treated to be hydrophobic by forming a hydrophobic coating layer on at least one surface thereof. The gas blocking inorganic particles 21 having the hydrophobic coating layers on at least one surface thereof may be non-continuously aligned without agglomeration on the upper surface, lower surface, or inside of the ion-conductive polymer layer 20.

Subsequently, the resulting structure may be dried, thereby preparing a composite membrane 23 according to another example embodiment.

The drying of the resulting structure whereby the organic solvent is removed may be performed, for example, at a temperature of about room temperature (e.g., 25° C.) to about 60° C. As the organic solvent is removed, the gas blocking inorganic particles 11 having the hydrophobic coating layers may remain on the ion-conductive polymer layer 20.

For example, the organic solvent of the ion-conductive layer forming composition may be at least one selected from N-methylpyrrolidone (NMP), methanol, ethanol, chloroform, methylene chloride, methyl ethyl ketone, acetonitrile, acetone, formamide, dimethyl formamide, tetrahydrofuran, N-methyl-2-pyrrolidone, dimethyl sulfoxide, 1,3-dioxolane, sulfolane, dimethyl sulfolane, ethyl acetate, benzene, toluene, 1,2-dichloroethane, and hexanes.

The gas blocking inorganic particles having a hydrophobic coating layer on at least one surface thereof may be prepared by reacting the gas blocking inorganic particles with a compound represented by Formula 1; and washing and drying the resulting reaction product.

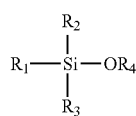

Formula 1

In Formula 1, $R_1$ to $R_3$ may each independently be selected from a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C7-C20 arylalkyl group, a substituted or unsubstituted C6-C20 aryloxy group, a substituted or unsubstituted C2-C20 heteroaryl group, a substituted or unsubstituted C2-C20 heteroaryloxy group, a substituted or unsubstituted C3-C20 heteroarylalkyl group, a substituted or unsubstituted C2-C20 heterocyclic group, and a halogen atom; and $R_4$ may be selected from hydrogen, a substituted or unsubstituted C1-C20 alkyl group, and a substituted or unsubstituted C6-C20 aryl group.

The gas blocking inorganic particles may be prepared through grinding and sieving such that an average particle diameter is about 1 μm to about 300 μm, and in another example embodiment, about 1 μm to about 200 μm, and in still another example embodiment, about 1 μm to about 100 μm.

The size of the gas blocking inorganic particles is a factor related to the ion conductivity of the composite membrane. Accordingly, the size of the gas blocking inorganic particles may be appropriately controlled to be uniform. To this end, gas blocking inorganic particles having a desired average particle diameter may be collected through sieving.

For example, the gas blocking inorganic particles may have an average particle diameter of about 1 μm to about 300 μm, and in another example embodiment, about 1 μm to about 200 μm, and in still another example embodiment, about 1 μm to about 100 μm. In another example embodiment, the gas blocking inorganic particles may have an average particle diameter of about 90 μm to about 200 μm, and in another example embodiment, about 90 μm to about 100 μm. The gas blocking inorganic particles may have an average particle diameter as defined hereinabove.

In an embodiment, the gas blocking inorganic particles may be prepared through grinding and further sorting to have an average particle diameter of about 1 μm to about 300 μm, before undergoing a reaction with the compound of represented by Formula 1.

The grinding may be performed using, for example, a bead mill. Beads used in the grinding may have a diameter of, for example, about 0.5 mm to about 2 mm, and the speed of rotation of a grinder may be, for example, from about 1000 revolutions per minute (rpm) to about 2000 rpm. When the diameter of the beads and the speed of rotation of the grinder are within these ranges, pulverization of the gas blocking inorganic particles which may be, for example, lithium-titanium-aluminum-phosphate (LTAP, $Li_{1.4}Ti_{1.6}Al_{0.4}P_3O_{12}$), may be inhibited.

For example, the beads may be zirconia beads or alumina beads. However, embodiments are not limited thereto.

The reacting of the gas blocking inorganic particles with the compound represented by Formula 1 may be performed by immersion, spray, or ball milling.

In an embodiment, the reacting of the gas blocking inorganic particles with the compound represented by Formula 1 may be performed by immersion, i.e., by mixing a composition including the gas blocking inorganic particles, the compound represented by Formula 1, and a solvent at a temperature at about room temperature (e.g., 25° C.) to about 60° C., and removing the solvent from the resulting mixture.

For example, the reacting of the gas blocking inorganic particles and the compound represented by Formula 1 may be performed for about 20 hours or less, and in an example embodiment, for about 3 hours to about 10 hours.

In another embodiment, the reacting of the gas blocking inorganic particles with the compound represented by Formula 1 may be performed by spraying a composition including the compound represented by Formula 1 and a solvent onto the at least one surface of the gas blocking inorganic particles, for example on substantially the entire surface of each of the gas blocking inorganic particles.

In the above-described immersion and spray methods, the solvent may be any suitable solvent in which the gas blocking inorganic particles and the compound represented by Formula 1 may be uniformly mixed or dispersed. For example, the solvent may be at least one selected from toluene, methylene chloride, methanol, ethanol, propanol, ethyl acetate, and diethylether.

The washing of the reaction product may be performed using a solvent, for example, acetone. The drying may be performed, for example, at a temperature of about room temperature (e.g., 25° C.) to about 85° C.

Through the above-described processes, the gas blocking inorganic particles having a hydrophobic coating layer on at least one surface thereof may be obtained. The gas blocking inorganic particles may have hydrophobic properties. The hydrophobic layer on the gas blocking inorganic particles may be a continuous or non-continuous coating layer and may have a thickness of, for example, about 1 nanometer (nm) to about 100 nm. Since the thickness of the hydrophobic coating layer is relatively less than a total thickness of the composite membrane, substantially no reduction in the ion conductivity may occur by applying the hydrophobic coating layer on the at least one surface of the gas blocking inorganic particles.

The hydrophobic coating layer may have a thickness of about 1 nm to about 80 nm, and in another embodiment, about 1 nm to about 50 nm, and in still another embodiment, about 1 nm to about 15 nm. For example, the hydrophobic coating layer may have a thickness of about 1 nm to about 10 nm.

In an embodiment, the composite membrane may have a thickness of about 10 μm to about 200 μm, for example, about 70 μm to about 100 μm.

A composite membrane according to an embodiment may serve as a lithium ion conductive membrane to protect the anode and as a protective membrane which selectively allows lithium ions to pass through to prevent other materials from reacting with the anode. The composite membrane as a protective layer may be formed as a thin film, thus reducing electrical resistance and improving ion conductivity.

For example, the composite membrane according to an embodiment may be used as a protective layer or an oxygen barrier layer of a lithium air battery, a protective layer of a lithium-sulfur battery, a protective layer, or a separator of an aqueous lithium ion battery, or a separator of a fuel cell.

The composite membrane according to any embodiment is a membrane comprising polyvinylidene fluoride, N,N-diethyl-N-methyl-N-(2-methoxyethyl)ammonium bis(trifluoromethanesulfonyl)imide, lithium bis(trifluoromethylsulfonyl)imide, SiO$_2$, and Li$_{1+x+y}$Al$_x$Ti$_{2-x}$Si$_y$P$_{3-y}$O$_{12}$ wherein 0<x<2 and 0≤y<3; or a membrane comprising a porous layer and a layer comprising poly(diallyldimethylammonium) bis(trifluoromethanesulfonyl)imide, N,N-diethyl-N-methyl-N-(2-methoxyethyl)ammonium bis(trifluoromethanesulfonyl)imide, lithium bis(trifluoromethanesulfonyl)imide, SiO$_2$, and Li$_{1+x+y}$Al$_x$Ti$_{2-x}$Si$_y$P$_{3-y}$O$_{12}$ wherein 0<x<2 and 0≤y<3 in the porous layer; a membrane comprising polyvinylidene fluoride, N,N-diethyl-N-methyl-N-(2-methoxyethyl)ammonium bis(trifluoromethanesulfonyl)imide, lithium bis(trifluoromethylsulfonyl)imide, SiO$_2$, and Li$_{1+x+y}$Al$_x$Ti$_{2-x}$Si$_y$P$_{3-y}$O$_{12}$, wherein 0<x<2, 0≤y<3, having a hydrophobic coating layer on a surface thereof; or a membrane comprising a porous layer; and a layer comprising poly(diallyldimethylammonium) bis(trifluoromethanesulfonyl)imide, N,N-diethyl-N-methyl-N-(2-methoxyethyl)ammonium bis(trifluoromethanesulfonyl)imide, lithium bis(trifluoromethanesulfonyl)imide, SiO$_2$, and Li$_{1+x+y}$Al$_x$Ti$_{2-x}$Si$_y$P$_{3-y}$O$_{12}$ wherein 0<x<2 and 0≤y<3, having a hydrophobic coating layer on a surface thereof on the porous layer.

According to an aspect, a battery assembly includes an electrolyte; a lithium metal or a lithium metal alloy; and the composite membrane. The battery assembly can be used, for example, for a lithium air battery, lithium sulfur battery, and all solid battery.

According to another aspect of the present disclosure, a lithium air battery includes a cathode, an anode, and a composite membrane according to any of the above-described example embodiments. FIG. 3A is a schematic view illustrating a structure of a lithium air battery including a composite membrane according to an embodiments.

Referring to FIG. 3A, a lithium air battery according to an embodiment may include an anode electrolyte 34 stacked on an anode 33, a composite membrane 35 according to an embodiment as a gas blocking layer on the anode electrolyte 34, a cathode 37, and a cathode electrolyte 36 between the composite membrane 35 as a gas blocking layer and the cathode 37.

The anode 33 may be, for example, a lithium metal thin film. The composite membrane 35 may also serve as a lithium metal protective layer. The composite membrane 35 according to an embodiment may be lightweight and may have improved flexibility and oxygen blocking ability.

The electrolyte including the anode electrolyte 34 and the cathode electrolyte 36 may be an aqueous electrolyte or non-aqueous electrolyte. These electrolytes may be the same as those to be described later in connection with a lithium air battery according to another embodiment.

According to another aspect of the present disclosure, a lithium air battery includes an anode, a composite membrane according to an embodiment, and a cathode including oxygen as a cathode active material.

In an embodiment, the lithium air battery may use an aqueous electrolyte or a non-aqueous electrolyte as an electrolyte between the cathode and the anode.

When the electrolyte of the lithium air battery is a non-aqueous electrolyte, the reaction mechanism may be represented by Reaction Scheme 1.

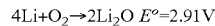

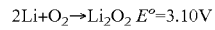

Reaction Scheme 1

During discharging, lithium from the anode reacts with oxygen from the cathode to form lithium oxide, and oxygen is reduced. On the contrary, during charging, oxygen is oxidized when lithium oxide is reduced.

A shape of the lithium air battery may be any of a variety of suitable shapes, and in an embodiment, the shape may be that of a coin, a button, a sheet, a stack, a cylinder, a plane, or a horn. The lithium air battery may be applicable as a large battery for electric vehicles.

Figure 3B:
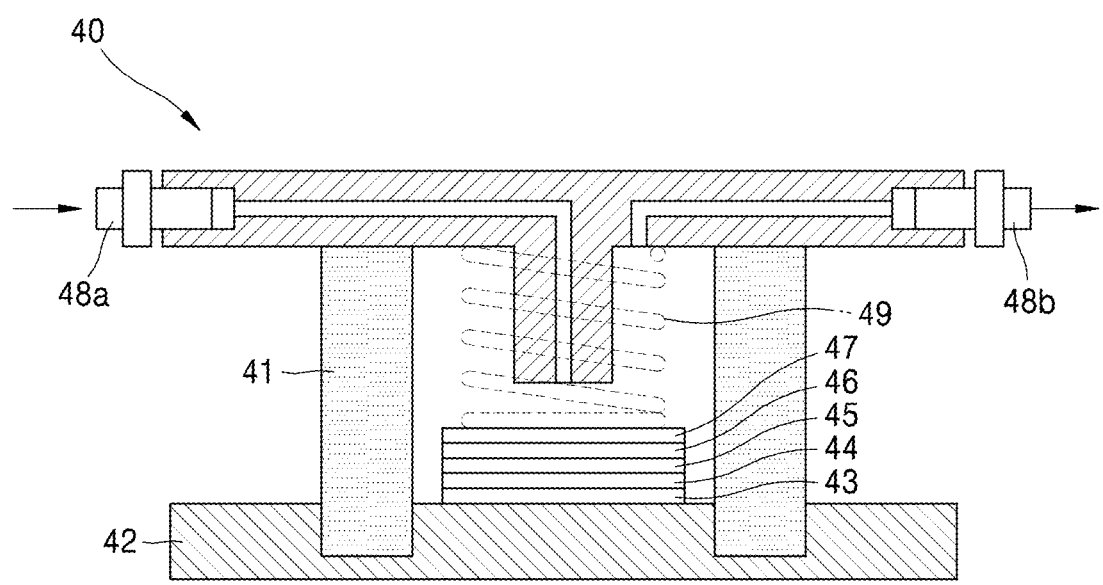
FIG. 3B is a schematic view illustrating a structure of an embodiment of lithium air battery, the lithium air battery including an embodiment of the composite membrane.
Figure 3C:
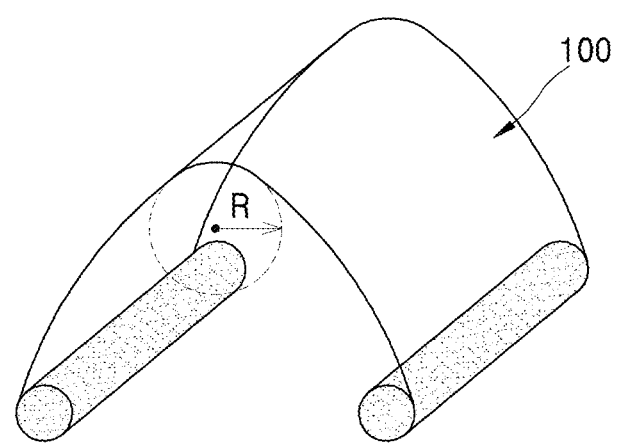
FIG. 3C is a perspective view illustrating a radius of curvature of a composite membrane.

FIG. 3B is a schematic view illustrating a lithium air battery 40 according to another embodiment.

Referring to FIG. 3B, the lithium air battery 40 may have a structure in which a composite membrane 45 according to an above-described example embodiment is between a cathode 47, which uses oxygen as an active material, and an anode 43 on a base 42. An electrolyte 44 may be between the anode 43 and the composite membrane 45. The anode 43, the electrolyte 44, and the composite membrane 45 may constitute a protected anode.

The electrolyte 44 may have good lithium ion conductivity and a low electrical resistance per unit area against the anode 43.

A lithium ion-conductive solid electrolyte membrane or a separator may be further included between the anode 43 and the electrolyte 44, or between the electrolyte 44 and the composite membrane 45.

The cathode 47 may include a current collector, and a pressing member 49 for transferring air to the cathode 47 may be on the current collector. As illustrated in FIG. 3B, the cathode 47 and the anode 43 may be accommodated in a case 41 made of an insulating resin. Air may be supplied via an air inlet 48a and may be discharged through an air outlet 48b.

As used herein, the term "air" is not limited to atmospheric air, and may refer to a combination of gases including oxygen, or pure oxygen gas.

An electrolyte 46 may be between the composite membrane 45 and the cathode 47. A lithium ion-conductive solid electrolyte membrane or a separator may be further included between the cathode 47 and the electrolyte 46, or between the electrolyte 46 and the composite membrane 45.

For example, the composite membrane 45 may be on a surface of the anode 43 to serve as a protective membrane for protecting lithium of the anode 43 from the electrolyte 44.

The composite membrane 45 may be a single layer or a multilayer.

The electrolytes 44 and 46 may be polymer solid electrolytes. Such a polymer solid electrolyte may be a polyethylene oxide doped with a lithium salt. For example, the lithium salt may be at least one selected from LiBF$_4$, LiPF$_6$, LiSbF$_6$, LiAsF$_6$, LiClO$_4$, LiCF$_3$SO$_3$, LiN(SO$_2$CF$_3$)$_2$, LiN(SO$_2$C$_2$F$_5$)$_2$, LiC(SO$_2$CF$_3$)$_3$, LiN(SO$_2$F)$_2$, LiC$_4$F$_9$SO$_3$, and LiAlCl$_4$.

In another embodiment, the electrolytes 44 and 46 may be liquid electrolytes including a solvent and a lithium salt.

The solvent may include at least one selected from an aprotic solvent and water.

Non-limiting examples of the aprotic solvent are a carbonate-based solvent, an ester-based solvent, an ether-based solvent, a ketone-based solvent, an amine-based solvent, and a phosphine-based solvent.

Non-limiting examples of the carbonate-based solvent are dimethyl carbonate (DMC), diethyl carbonate (DEC), ethyl methyl carbonate (EMC), dipropyl carbonate (DPC), methylpropyl carbonate (MPC), ethylpropyl carbonate (EPC), ethylene carbonate (EC), propylene carbonate (PC), and butylene carbonate (BC).

Non-limiting examples of the ester-based solvent are methyl acetate, ethyl acetate, n-propyl acetate, tert-butyl acetate, methyl propionate (MP), ethyl propionate, γ-butyrolactone, decanolide, valerolactone, mevalonolactone, and caprolactone.

Non-limiting examples of the ether-based solvent are dibutyl ether, tetraglyme, diglyme, dimethoxyethane, 2-methyltetrahydrofuran, and tetrahydrofuran. An example of the ketone-based solvent is cyclohexanone.

Non-limiting examples of the amine-based solvent are triethylamine and triphenylamine. An example of the phosphine-based solvent is triethylphosphine. The embodiments of the present inventive concept are not limited to the above, and any appropriate aprotic solvent available in the art may be used.

Examples of the aprotic solvent are nitriles (such as R—CN, wherein R is a C2-C30 linear, branched, or cyclic hydrocarbon-based moiety that may include a double-bond, an aromatic ring, or an ether bond), amides (such as N,N-dimethylformamide), dioxolanes (such as 1,3-dioxolane), and sulfolanes.

The aprotic solvent may be used alone or in a combination of at least two aprotic solvents. In the latter, a mixing ratio of the at least two aprotic solvents may be appropriately adjusted depending on a desired performance of the battery. This will be understood by one of ordinary skill in the art.

The electrolytes 44 and 46 may include an ionic liquid.

The electrolytes 44 and 46 may be partially or completely impregnated into the anode 43 and the cathode 47, respectively.

In an embodiment, a lithium ion-conductive solid electrolyte membrane may be used as the electrolytes 44 and 46.

The lithium ion-conductive solid electrolyte membrane may include an inorganic material including a lithium ion-conductive glass, a lithium ion-conductive crystal (ceramic or glass-ceramic), or a combination thereof. For example, the lithium ion-conductive solid electrolyte membrane may include an oxide, in view of chemical stability.

When the lithium ion-conductive solid electrolyte membrane includes a large amount of lithium ion-conductive crystals, a high ionic conductivity may be attainable. For example, the lithium ion-conductive solid electrolyte membrane may include an amount of about 50 weight percent (wt %) or greater, about 55 wt % or greater, or about 60 wt % or greater, or 50 wt % to 95 wt %, or 55 wt % to 90 wt % of the lithium ion-conductive crystals, based on a total weight of the lithium ion-conductive solid electrolyte membrane.

The lithium ion-conductive crystals may be lithium-ion conductive crystals having a Perovskite structure, such as $Li_3N$, LISICON, $La_{0.55}Li_{0.35}TiO_3$, and the like, $LiTi_2P_3O_{12}$ crystals having a NASICON structure, or a glass-ceramic able to form these crystals.

For example, the lithium ion-conductive crystals may be $Li_{1+x+y}(Al_q,Ga_{1-q})_x(Ti_h,Ge_{1-h})_{2-x}Si_yP_{3-y}O_{12}$ crystals (where $0 \leq q \leq 1$, $0 \leq h \leq 1$, $0 \leq x \leq 1$, and $0 \leq y \leq 1$, and for example, $0 \leq x \leq 0.4$ and $0 < y \leq 0.6$, or $0.1 \leq x \leq 0.3$ and $0.1 < y \leq 0.4$). To have a high ionic conductivity, the lithium-ion conductive particles may be substantially free of grain boundaries that may disrupt ionic conduction. For example, a lithium ion-conductive glass-ceramic free of pores or grain boundaries that impair the conduction of ions may have high ionic conductivity and high chemical stability.

Non-limiting examples of the lithium ion-conductive glass-ceramic are lithium-aluminum-germanium-phosphate (LAGP), lithium-aluminum-titanium-phosphate (LATP), and lithium-aluminum-titanium-silicon-phosphate (LATSP).

For example, when a parent glass with a composition of $Li_2O$—$Al_2O_3$—$TiO_2$—$SiO_2$—$P_2O_5$ is thermally treated for crystallization, a main crystal phase of $Li_{1+x+y}Al_xTi_{2-x}Si_yP_{3-y}O_{12}$ (wherein $0 \leq x \leq 2$ and $0 \leq y \leq 3$) may be obtained. For example, x and y may be as follows: for example, $0 \leq x \leq 0.4$ and $0 < y \leq 0.6$, and in another embodiment, $0.1 \leq x \leq 0.3$ and $0.1 < y \leq 0.4$.

As used herein, the pores or grain boundaries blocking conduction of ions refers to pores or grain boundaries that inhibit conductivity of the entire inorganic material including the lithium ion-conductive crystals to 1/10 or less of conductivity of the lithium ion-conductive crystals of the inorganic material.

The cathode 47, using oxygen as a cathode active material, may include a conductive material. The conductive material may be porous. Any suitable porous and conductive material may be used as a cathode active material, and in an example embodiment, a porous carbonaceous material may be used. Suitable carbonaceous materials include carbon blacks, graphites, graphenes, activated carbons, carbon fibers, and combinations thereof. The cathode active material may be a metallic conductive material, for example, a metal fiber, a metal mesh, or the like. For example, the cathode active material may comprise at least one selected from copper, silver, nickel, and aluminum. Organic conductive materials, including polyphenylene derivatives, may be used. The above-listed conductive materials may be used alone or a combination of the conductive materials may be used.

The cathode 47 may further include a catalyst for oxidation or reduction of oxygen. Examples of the catalyst include, but are not limited to, precious metal-based catalysts, such as platinum (Pt), gold (Au), silver (Ag), palladium (Pd), ruthenium (Ru), rhodium (Rh), and osmium (Os); oxide-based catalysts, such as manganese oxide, iron oxide, cobalt oxide, and nickel oxide; and organometallic-based catalysts, such as cobalt phthalocyanine. Any appropriate oxidation or reduction catalyst for oxygen, including those available in the art, may be used.

The catalyst may be supported on a support. Examples of the support are oxide, zeolite, a clay-based mineral, and carbon. The oxide may include at least one oxide of alumina, silica, zirconium oxide, and titanium dioxide. The oxide may be an oxide bearing at least one metal selected from the group consisting of cerium (Ce), praseodymium (Pr), samarium (Sm), europium (Eu), terbium (Tb), thulium (Tm), ytterbium (Yb), antimony (Sb), bismuth (Bi), vanadium (V), chromium (Cr), manganese (Mn), iron (Fe), cobalt (Co), nickel (Ni), copper (Cu), niobium (Nb), molybdenum (Mo), and tungsten (W). Examples of the carbon available as the support are, but are not limited to, carbon blacks, such as ketjen black, acetylene black, channel black, and lamp black; graphites, such as natural graphite, artificial graphite, and expanded graphite; activated carbons; and carbon fibers.

Any appropriate material available as supports, including those in the art, may be used.

The cathode 47 may further include a binder. The binder may include a thermoplastic resin or a thermocurable resin. Examples of the binder include, but are not limited to, polyethylene, polypropylene, polytetrafluoroethylene (PTFE), polyvinylidene fluoride (PVDF), styrene-butadiene rubber, a tetrafluoroethylene-perfluoroalkylvinylether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a fluorovinylidene-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoro ethylene copolymer, and an ethylene-acrylic acid copolymer, which may be used alone or in any combination thereof. Any suitable appropriate binder, including those available in the art, may be used.

The cathode 47 may be manufactured as follows. For example, an oxygen oxidation/reduction catalyst, a conductive material, and a binder may be mixed together, and the resultant mixture may be added to an appropriate solvent to prepare a cathode slurry. The cathode slurry may be coated on a surface of a current collector and then dried, optionally followed by press-molding to improve electrode density, to thereby form a cathode. Optionally the cathode may include a lithium oxide. Optionally the oxygen oxidation/reduction catalyst may be omitted.

A porous body in a matrix or mesh form may be used as the current collector to facilitate diffusion of oxygen. A porous metal plate made of, for example, stainless steel, nickel, or aluminum may be used. Materials for the current collector are not particularly limited, and any appropriate material for current collectors available in the art may be used. The current collector may be coated with an antioxidation metal or an alloy coating layer to prevent oxidation.

In an embodiment, when the anode 43 of the lithium air battery is a lithium-containing anode, the lithium-containing anode may include a lithium metal, a lithium metal-based alloy, a material that allows intercalation and deintercalation of lithium, or a material that allows deposition and dissolution of lithium. Materials for the anode 43 are not particularly limited to these materials, and any suitable material, including those available in the art, that includes Li or allows intercalation and deintercalation of lithium, or any suitable material, including those available in the art, that allows deposition and dissolution of lithium may be used. The cathode may determine a capacity of the lithium air battery.

For example, the anode 43 may be a lithium metal. Examples of the lithium-based alloy include alloys with at least one selected from aluminum (Al), tin (Sn), magnesium (Mg), indium (In), calcium (Ca), titanium (Ti), and vanadium (V).

A separator may be disposed between the cathode 47 and the anode 43. The separator is not specifically limited, and may have any composition durable in an operational environment of the lithium air battery. For example, the separator may be a polymeric non-woven fabric, such as polypropylene-based non-woven fabric or polyphenylene sulfide-based non-woven fabric, or a porous film of an olefin-based polymer, such as polypropylene or polyethylene; a combination of at least two of these materials may be used to form the separator.

According to an embodiment, the lithium air battery may include a composite membrane according to any one of the above-described embodiments and thus have improved specific capacity and lifetime characteristics.

For example, the separator between the cathode and the anode may be a mixed multi-layer such as a two-layered polyethylene/polypropylene separator, a three-layered polyethylene/polypropylene/polyethylene separator, or a three-layered polypropylene/polyethylene/polypropylene separator.

As noted above, the concentration of the lithium salt in the liquid electrolyte may be about 0.01M to about 5M, and in some other example embodiments, about 0.1M to about 2M.

Substituents in the formulae above may be defined as follows.

As used herein, the term "alkyl" indicates a completely saturated, branched or unbranched (or a straight or linear) hydrocarbon group.

Non-limiting examples of the "alkyl" group include methyl, ethyl, n-propyl, isopropyl, n-butyl, isobutyl, sec-butyl, t-butyl, isopentyl, neopentyl, n-hexyl, 3-methylhexyl, 2,2-dimethylpentyl, 2,3-dimethylpentyl, and n-heptyl.

At least one hydrogen atom of the alkyl group can be substituted with a halogen atom, a C1-C20 alkyl group substituted with a halogen atom (for example, $CCF_3$, $CF_3$, $CHCF_2$, $CHF_2$, $CH_2F$, $CCl_3$, and the like), a C1-C20 alkoxy group, a C2-C20 alkoxyalkyl group, a hydroxyl group, a nitro group, a cyano group, an amino group, an amidino group, a hydrazine group, a hydrazone group, a carboxyl group or a salt thereof, a sulfonyl group, a sulfamoyl group, a sulfonic acid group or a salt thereof, a phosphoric acid group or a salt thereof, a C1-C20 alkyl group, a C2-C20 alkenyl group, a C2-C20 alkynyl group, a C1-C20 heteroalkyl group, a C6-C20 aryl group, a C7-C20 arylalkyl group, a C6-C20 heteroaryl group, a C7-C20 heteroarylalkyl group, a C6-C20 heteroaryloxy group, a C7-C20 heteroaryloxyalkyl group, or a C7-C20 heteroarylalkyl group.

The term "halogen atom" indicates fluorine, bromine, chlorine, iodine, and the like.

The term "C1-C20 alkyl group substituted with a halogen atom" indicates a C1-C20 alkyl group substituted with at least one halo group. Non-limiting examples of the C1-C20 alkyl group substituted with a halogen atom include monohaloalkyl, polyhaloalkyls including dihaloalkyl, or perhaloalkyl.

Monohaloalkyls indicate alkyl groups including one iodine, bromine, chloride, or fluorine atom. Dihaloalkyls and polyhaloalkyls indicate alkyl groups including at least two identical or different halo atoms.

As used herein, the term "alkoxy" represents "alkyl-O—", wherein the alkyl is the same as described above. Non-limiting examples of the alkoxy group include methoxy, ethoxy, propoxy, 2-propoxy, butoxy, t-butoxy, pentyloxy, and hexyloxy. At least one hydrogen atom of the alkoxy group may be substituted with any of the substituents recited above that may be substituted in place of at least one hydrogen atom of the alkyl group.

As used herein, the term "alkenyl" indicates a branched or unbranched hydrocarbon group with at least one carbon-carbon double bond. Non-limiting examples of the alkenyl group include vinyl, allyl, butenyl, propenyl, and isobutenyl. At least one hydrogen atom in the alkenyl group may be substituted with any of the substituents recited above that may be substituted in place of at least one hydrogen atom of the alkyl group.

As used herein, the term "alkynyl" indicates a branched or unbranched hydrocarbon group with at least one carbon-carbon triple bond. Non-limiting examples of the "alkynyl" group include ethynyl, butynyl, isobutynyl, isopropynyl, and propynyl.

At least one hydrogen atom of the "alkynyl" group may be substituted with any of the substituents recited above that may be substituted in place of at least one hydrogen atom of the alkyl group.

The term "aliphatic group" means a saturated or unsaturated linear or branched hydrocarbon group. An aliphatic group may be an alkyl, alkenyl, or alkynyl group, for example.

"Alkylene" means a straight, branched or cyclic divalent aliphatic hydrocarbon group, and may have from 1 to about 18 carbon atoms, more specifically 2 to about 12 carbons. Exemplary alkylene groups include methylene (—$CH_2$—), ethylene (—$CH_2CH_2$—), or propylene (—$(CH_2)_3$—).

As used herein, the term "aryl" group, which is used alone or in combination, indicates an aromatic hydrocarbon group containing at least one ring.

"Arylene" means a divalent radical formed by the removal of two hydrogen atoms from one or more rings of an aromatic hydrocarbon, wherein the hydrogen atoms may be removed from the same or different rings (preferably different rings), each of which rings may be aromatic or nonaromatic.

The term "aryl" is construed as including a group with an aromatic ring fused to at least one cycloalkyl ring.

Non-limiting examples of the "aryl" group include phenyl, naphthyl, and tetrahydronaphthyl.

At least one hydrogen atom of the "aryl" group may be substituted with any of the substituents recited above that may be substituted in place of at least one hydrogen atom of the alkyl group.

The term "arylalkyl" indicates an alkyl group in which one of the hydrogens is substituted with an aryl group. Examples of the arylalkyl group are benzyl groups.

As used herein, the term "aryloxy" indicates "—O-aryl". An example of the aryloxy group is phenoxy. At least one hydrogen atom of the "aryloxy" group may be substituted with any of the substituents recited above that may be substituted in place of at least one hydrogen atom of the alkyl group.

As used herein, the term "heteroaryl group" indicates a monocyclic or bicyclic organic aromatic group including at least one heteroatom selected from among nitrogen (N), oxygen (O), phosphorous (P), and sulfur (S), wherein the rest of the cyclic atoms are all carbon. The heteroaryl group may include, for example, one to five heteroatoms, and in another embodiment, may include a five- to ten-membered ring. In the heteroaryl group, S or N may be present in various oxidized forms.

At least one hydrogen atom of the "heteroaryl" group may be substituted with any of the substituents recited above that may be substituted in place of at least one hydrogen atom of the alkyl group.

"Heteroarylene" means a divalent radical formed by the removal of two hydrogen atoms from one or more rings of a heteroaryl moiety, wherein the hydrogen atoms may be removed from the same or different rings (preferably the same ring), each of which rings may be aromatic or nonaromatic.

The term "heteroarylalkyl" group indicates an alkyl group substituted with a heteroaryl group. At least one hydrogen atom of the heteroarylalkyl group may be substituted with any of the substituents recited above that may be substituted in place of at least one hydrogen atom of the alkyl group.

The term "heteroaryloxy" group indicates a "—O-heteroaryl moiety". At least one hydrogen atom of the heteroaryloxy group may be substituted with any of the substituents that are the same as those recited above in conjunction with the alkyl group.

The term "heteroaryloxyalkyl" group indicates an alkyl group substituted with a heteroaryloxy group. At least one hydrogen atom of the heteroaryloxyalkyl group may be substituted with any of the substituents recited above that may be substituted in place of at least one hydrogen atom of the alkyl group.

As used herein, the term "carbocyclic" group indicates a saturated or partially unsaturated non-aromatic monocyclic, bicyclic, or tricyclic hydrocarbon group.

Non-limiting examples of the monocyclic hydrocarbon group include cyclopentyl, cyclopentenyl, cyclohexyl, and cyclohexcenyl. Non-limiting examples of the bicyclic hydrocarbon group include bornyl, decahydronaphthyl, bicyclo[2.1.1]hexyl, bicyclo[2.2.1]heptyl, bicyclo[2.2.1]heptenyl, or bicyclo[2.2.2]octyl.

An example of the tricyclic hydrocarbon group is adamantyl.

At least one hydrogen atom of the "carbocyclic group" may be substituted with any of the substituents recited above that may be substituted in place of at least one hydrogen atom of the alkyl group.

As used herein, the term "heterocyclic group" indicates a five- to ten-membered cyclic group including at least one heteroatom such as N, S, P, or O. An example of the heterocyclic group is pyridyl. At least one hydrogen atom in the heterocyclic group may be substituted with any of the substituents recited above that may be substituted in place of at least one hydrogen atom of the alkyl group.

The term "sulfonyl" indicates R"—$SO_2$—, wherein R" is a hydrogen atom, alkyl, aryl, heteroaryl, aryl-alkyl, heteroaryl-alkyl, alkoxy, aryloxy, cycloalkyl, or a heterocyclic group.

The term "sulfamoyl group" refers to $H_2NS(O_2)$—, alkyl-NHS($O_2$)—, (alkyl)$_2$NS($O_2$)—, aryl-NHS($O_2$)—, alkyl (aryl)-NS($O_2$)—, (aryl)$_2$NS(O)$_2$, heteroaryl-NHS($O_2$)—, (aryl-alkyl)-NHS($O_2$)—, or (heteroaryl-alkyl)-NHS($O_2$)—.

At least one hydrogen atom of the sulfamoyl group may be substituted with any of the substituents recited above that may be substituted in place of at least one hydrogen atom of the alkyl group.

The term "amino group" indicates a group with a nitrogen atom covalently bonded to at least one carbon or heteroatom. "Amino" has the general formula —N(R)$_2$, wherein each R is independently hydrogen, a C1 to C6 alkyl, or a C6 to C12 aryl. The amino group may include, for example, —$NH_2$ and substituted moieties. The term "amino group" also refers to an "alkylamino group" with nitrogen bonded to at least one additional alkyl group, and "arylamino" and "diarylamino" groups with nitrogen bonded to one or two aryl groups, respectively.

One or more embodiments of the present disclosure will now be described in detail with reference to the following examples. However, these examples are only for illustrative purposes and are not intended to limit the scope of the one or more embodiments of the present disclosure.

EXAMPLES

Preparation Example 1

PFO-SH-LTAP, which refers to the reaction product of 1H,1H,2H,2H-perfluorooctyltriethoxysilane (PFO), 3-(mercaptopropyl)trimethoxysilane (SH), and $Li_{1.6}Ti_{1.6}Al_{0.4}P_3O_{12}$(LTAP), as a surface-modified LTAP was prepared using PFO and 3-(mercaptopropyl)trimethoxysilane (SH) by the following processes.

A lithium ion-conductive ceramic plate (Ohara glass, available from Ohara corporation, thickness of about 260 μm) including crystalline LTAP ($L_{1.4}Ti_{1.6}Al_{0.4}P_3O_{12}$) was ground and then sieved to obtain LTAP particles having a size (average particle diameter) of about 49 μm.

About 200 mg of the LTAP particles, 20 mL of toluene, and 50 mg of (3-mercaptopropyl)trimethoxysilane (SH) were added into a vial and stirred at about 25° C. for about 7 hours.

The resulting reaction product was filtered, washed with acetone, and then vacuum dried at about 60° C. for about 2 hours. The vacuum-dried product was sieved to obtain SH-LTAP particles having a size (average particle diameter) of about 49 μm, which are LTAP particles having a hydrophobic coating layer resulting from condensation of SH.

About 200 mg of the SH-LTAP particles, 20 mg of toluene, and about 50 g of PFO were mixed together for about 30 minutes. The reaction mixture was filtered, washed with acetone, vacuum-dried at about 60° C. for about 2 hours, and then sieved to obtain PFO-SH-LTAP particles modified with PFO.

The PFO-SH-LTAP particles had a uniform hydrophobic coating layer modified with PFO and SH.

Example 1

Polyvinylidene fluoride, (N,N-diethyl-N-methyl-(2-methoxyethyl)ammonium bis(trifluoromethanesulfonyl)imide (DEME-TFSI), and $Li(CF_3SO_2)_2N$ (LiTFSI) were mixed in a weight ratio of 1:1:1 in 100 mL of N-methylpyrrolidone (NMP). About 5 parts by weight of $SiO_2$ particles as inorganic particles having a particle diameter of about 7 nm, based on 100 parts by weight of DEME-TFSI, were added thereto and stirred for about 20 minutes to prepare a mixture.

This mixture was cast onto a glass substrate using a doctor blade, and about 5 mg (per unit area) of PFO-SH-LTAP particles (average particle diameter: 30 μm) were applied thereto, thereby preparing a composite membrane having a thickness of about 60 μm.

Example 2

Polyvinylidene fluoride, N,N-diethyl-N-methyl-(2-methoxyethyl)ammonium bis(trifluoromethanesulfonyl)imide (DEME-TFSI), and LiTFSI were mixed in a weight ratio of 1:1:1 in 100 mL of NMP. About 5 parts by weight of $SiO_2$ particles as inorganic particles having a particle diameter of about 7 nm, based on 100 parts by weight of DEME-TFSI, were added thereto and stirred for about 20 minutes to prepare a mixture.

The resultant mixture was cast onto a glass substrate using a doctor blade, and about 5 mg (per unit area) of the PFO-SH-LTAP particles (average particle diameter: 30 μm) of Preparation Example 1 were applied thereto, thereby preparing a composite membrane having a thickness of about 60 μm.

Example 3

Poly(diallyldimethylammonium) bis(trifluoromethanesulfonyl)imide, N,N-diethyl-N-methyl-(2-methoxyethyl) ammonium bis(trifluoromethanesulfonyl)imide(DEME-TFSI), and LiTFSI were mixed in a weight ratio of 1:1:1 in 100 mL of NMP. About 5 parts by weight of $SiO_2$ particles as inorganic particles having a particle diameter of about 7 nm, based on 100 parts by weight of DEME-TFSI, were added thereto and stirred for about 20 minutes to prepare a mixture.

This mixture was cast onto a porous separator (PE/PP membrane), and the PFO-SH-LTAP particles (average particle diameter: 30 μm) of Preparation Example 1 were applied thereto, thereby preparing a composite membrane. Here, the amount of the PFO-SH-LTAP particles was about 5 mg per unit area of the composite membrane.

Example 4

1.38 g of polyethylene oxide powder (having a weight average molecular weight of about 100,000 Da, available from Aldrich) and 0.9 g of $Li(CF_3SO_2)_2N$ (LiTFSI, Wako) were dispersed in 100 mL of acetonitrile (AN) used as a solvent, and stirred for about 24 hours to prepare an electrolyte forming composition.

This electrolyte forming composition was cast onto a Teflon dish, dried at about 20° C. for about 24 hours to remove the acetonitrile solvent, and then vacuum-dried at about 60° C. for about 12 hours to obtain a $PEO_{10}LiTFSI$ polymer electrolyte (hereinafter, referred to as PEO polymer electrolyte). The PEO polymer electrolyte had an average thickness of about 60 μm.

A lithium metal was disposed on a surface of the PEO polymer electrolyte (having a weight average molecular weight of about $1\times10^5$ Da), and the composite membrane of Example 1 was stacked on the opposite surface of the PEO polymer electrolyte. Next, another PEO polymer electrolyte was stacked on the composite membrane of Example 1, thereby manufacturing a battery assembly (lithium metal/PEO polymer electrolyte/PVA-LTAP composite membrane/PEO polymer electrolyte/lithium metal).

Examples 5 and 6

Battery assemblies were manufactured in the same manner as in Example 4, except that the composite membranes of Examples 2 and 3 were used respectively for Examples 5 and 6 instead of the composite membrane of Example 1.

Example 7

First, a cathode in sheet form was formed using a mixture of multiwalled carbon nanotubes (available from XinNano Material, Inc.), N,N-diethyl-N-methyl-N-(2-methoxyethyl) ammonium bis(trifluoromethanesulfonyl)imide (DEME-TFSI) containing 1 M lithium bis(trifluoromethyl sulfonylimide) (LiTFSI), and polyvinylidene fluoride in a weight ratio of about 5:25:1. The cathode in sheet form was cut into a disc form having a diameter of about 8 mm.

A lithium metal (having a thickness of 500 μm) in disc form having a diameter of about 15 mm was used as an anode.

2 g of polyethylene oxide, 0.31 g of silica gel, and 0.26 g of LiTFSI were dissolved in 50 mL of acetonitrile and mixed for about 7 hours to obtain a polymer solution. This polymer solution was cast onto a Teflon dish and dried to obtain a polymer electrolyte film having a thickness of about 190 μm. This polymer electrolyte film was punched into a polymer electrolyte disc having a diameter of about 15 mm.

A copper thin film, the lithium metal disc, the polymer electrolyte disc, the composition membrane of Example 2, a cathode, and a gas diffusion layer (35BA, available from SGL Group) were assembled to manufacture a lithium air battery.

Comparative Example 1

Polyvinylidene fluoride (PVDF), N,N-diethyl-N-methyl-(2-methoxyethyl)ammonium bis(trifluoromethanesulfonyl) imide (DEME-TFSI), and LiTFSI were mixed in a weight ratio of about 1:1:1 in 100 mL of NMP to obtain a mixture. This mixture was cast onto a glass substrate using a doctor blade and dried to prepare an ion-conductive layer having a thickness of about 40 μm.

Comparative Example 2

Poly(diallyldimethylammonium) bis(trifluoromethanesulfonyl)imide, N,N-diethyl-N-methyl-(2-methoxyethyl) ammonium bis(trifluoromethanesulfonyl)imide (DEME-TFSI), and LiTFSI were mixed in a weight ratio of 1:1:1 in 100 mL of NMP. About 5 parts by weight of $SiO_2$ particles as inorganic particles having a particle diameter of about 7 nm, based on 100 parts by weight of DEME-TFSI, were added thereto and stirred for about 20 minutes to prepare a mixture.

This mixture was cast onto a porous separator (PE/PP membrane) and dried to prepare a membrane.

Comparative Example 3

A LTAP membrane (Ohara glass, available from Ohara corporation) having a thickness of about 260 μm was used.

Comparative Example 4

Polyvinylidene fluoride, N,N-diethyl-N-methyl-(2-methoxyethyl)ammonium bis(trifluoromethanesulfonyl)imide (DEME-TFSI), and LiTFSI were mixed in a weight ratio of 1:1:1 in 100 mL of N-methylpyrrolidone. LTAP particles (average particle diameter: 30 μm) and $SiO_2$ particles as inorganic particles having a particle diameter of about 7 nm were added thereto and stirred for about 20 minutes to prepare a mixture. The amount of the LTAP particles was 300 parts by weight, and the amount of the $SiO_2$ particles was 0.05 parts by weight, each based on 100 parts by weight of DEME-TFSI.

The mixture was cast onto a glass substrate using a doctor blade, and LTAP particles (average particle diameter: 30 μm) were added thereto, thereby preparing a composite membrane having a thickness of about 60 μm. Here, the amount of LTAP particles was about 5 mg per unit area of the composite membrane.

Comparative Examples 5 and 6

Battery assemblies were manufactured in the same manner as in Example 4, except that the composite membranes of Comparative Examples 1 and 2 were respectively used for Comparative Examples 5 and 6 instead of the composite membrane of Example 1.

Comparative Example 7

An electrode assembly was manufactured in the same manner as in Example 7, except that the composite membrane of Comparative Example 1 was used instead of the composite membrane of Example 2.

Evaluation Example 1: Scanning Electron Microscopic (SEM) Analysis

The composite membrane of Example 2 was analyzed using a scanning electron microscope system (SNE-4500M/MCM-100, available from SEC Co., Ltd.).

Figure 4A:
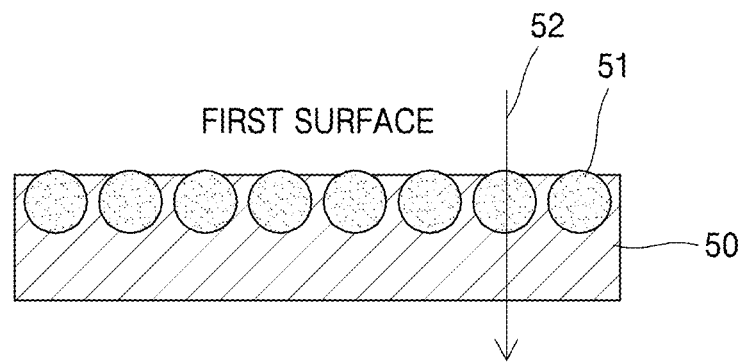
FIG. 4A is a schematic cross-sectional view illustrating a structure of a composite membrane of Example 2.
Figure 4B:
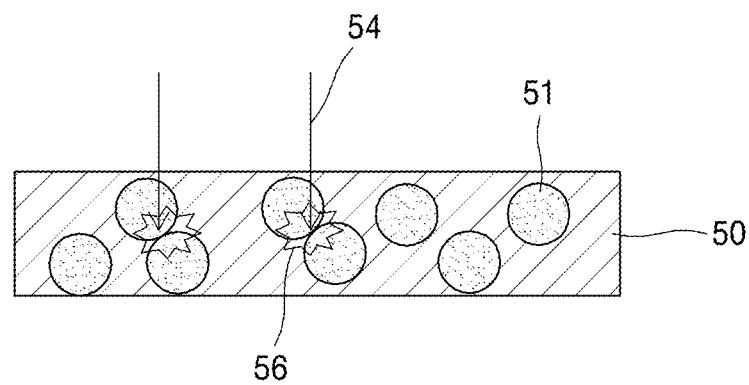
FIG. 4B is a schematic cross-sectional view illustrating a structure of a membrane of Comparative Example 4 as a gas blocking membrane.
Figure 5A:
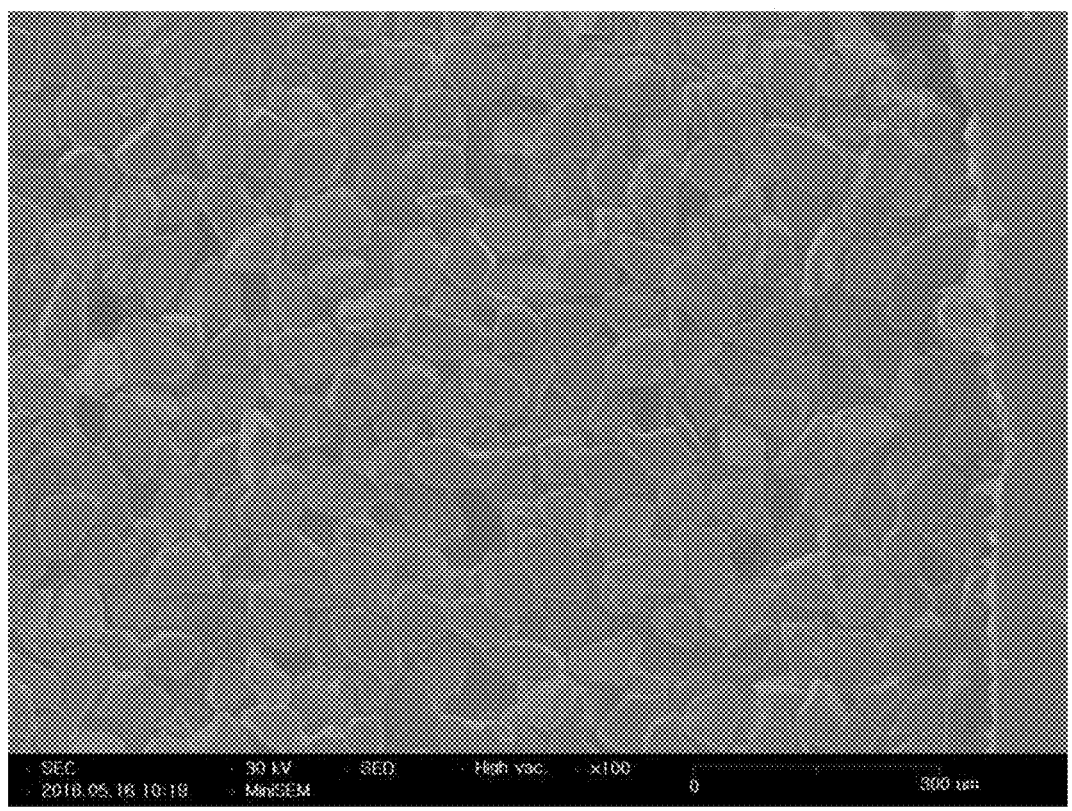
FIGS. 5A and 5B are scanning electron microscopic (SEM) images of top and bottom surfaces, respectively, of the composite membrane of Example 2.
Figure 5B:
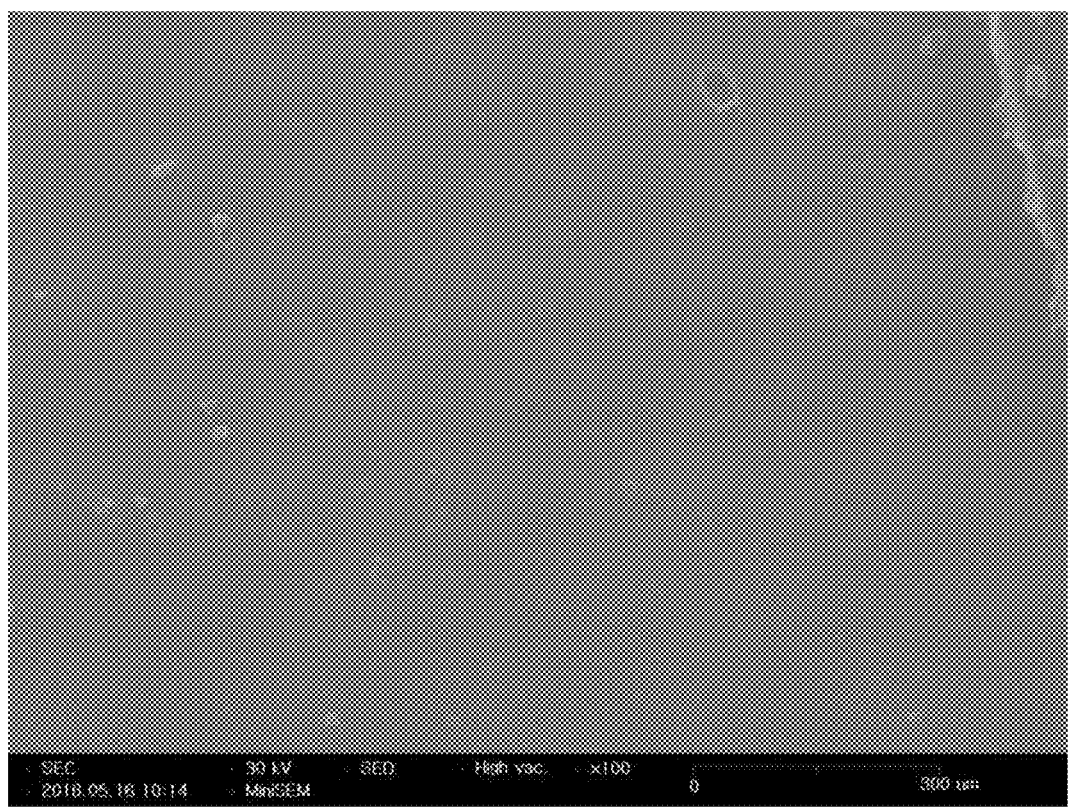
Figure 5C:
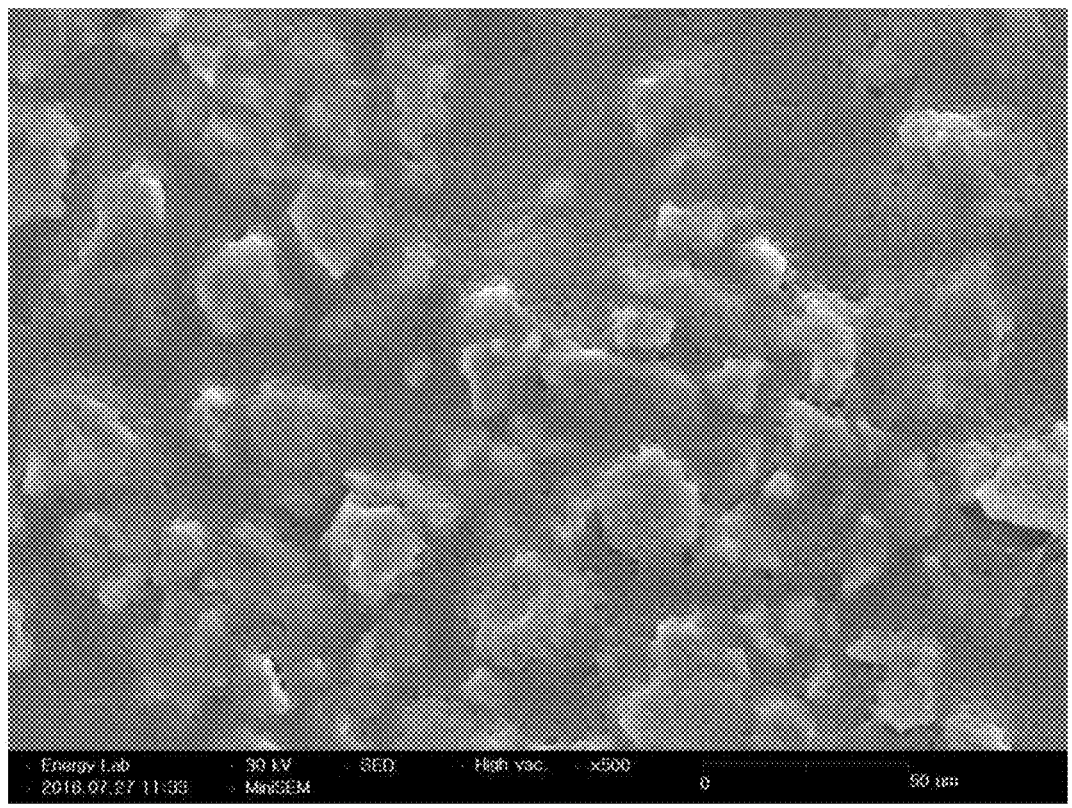
FIGS. 5C and 5D are SEM images of top and bottom surfaces of the composite membrane of Comparative Example 4, respectively.
Figure 5D:
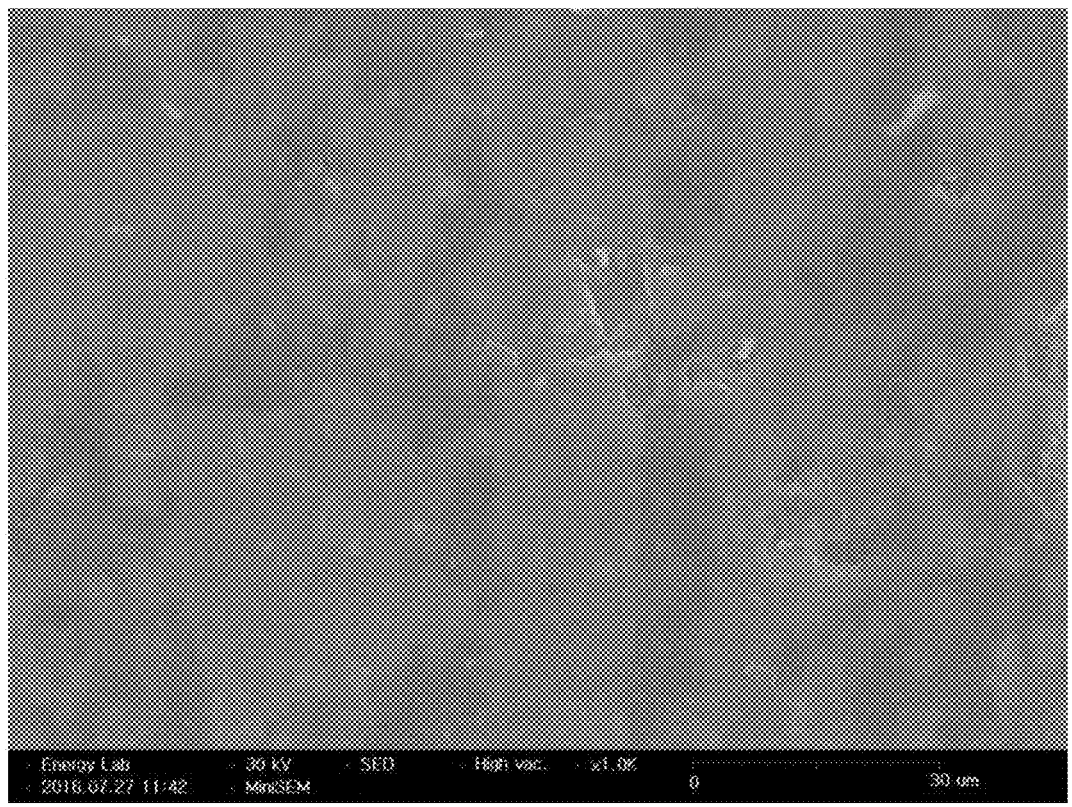

The SEM analysis results of the top and bottom surfaces of the composite membrane of Example 2 are shown in FIGS. 5A and 5B, respectively. The structure of the composite membrane 50 of Example 2 is shown in FIG. 4A. The SEM analysis results of the top and bottom surfaces of the composite membrane of Comparative Example 4 are shown in FIGS. 5C and 5D, respectively. FIG. 4B is a schematic cross-sectional view illustrating a structure of a membrane 50 of Comparative Example 4 as a gas blocking membrane;

Referring to FIGS. 4A, 5A, and 5B the composite membrane of Example 2 was found to have a structure of gas blocking inorganic particles 51 non-continuously aligned on a surface (first surface) adjacent to a cathode (not shown), unlike the composite membrane of Comparative Example 4 in FIGS. 4B, 5C, and 5D. In other words, LTAP particles as gas blocking inorganic particles 51 of the composite membrane of Example 2 were aligned in a region away from a lithium anode to inhibit reaction with lithium of the lithium anode.

As depicted in FIG. 4A, the gas blocking inorganic particles 51 of the composite membrane 50 of Example 2 were found to be aligned non-continuously, as exemplified by a spacing between adjacent gas blocking inorganic particles 51 as shown in FIG. 4A. This non-continuous alignment of the gas blocking inorganic particles in the composite membrane of Example 2 may prevent resistance of gas blocking inorganic particles to migration 52 of lithium ions. In contrast, as depicted in FIG. 4B, and while not wanting to be bound by theory, resistance against migration of lithium ions may likely occur when the gas blocking inorganic particles 51 have a continuous alignment, e.g., contact, or form an agglomerate 56 which blocks the migration path 54 of lithium ions. Therefore, the composite membrane of Example 2 may have improved ion conductivity as compared with the continuously aligned gas blocking particles 51 as illustrated in FIG. 4B.

Evaluation Example 2: Resistance Characteristics

Membrane assemblies were manufactured by sputtering platinum against opposite surfaces of each of the composite membranes of Examples 1 and 2 and the LTAP membrane of Comparative Example 4. The results of resistance measurement of the battery assemblies are shown in Table 1.

TABLE 1

| Example | Composition | Resistivity (Ω•cm) | Resistance per area (Ω•cm$^{-2}$) |
|---|---|---|---|
| Example 1 | PVDF, LTAP | 4.28E+05 | 1.93E+03 |
| Example 2 | PVDF, PFO-SH-LTAP | 4.62E+05 | 4.62E+03 |
| Comparative Example 4 | PVDF + LTAP blend | 7.04E+08 | 2.11E+06 |

Referring to Table 1, the composite membrane of Examples 1 and 2 was found to have reduced resistivity and resistance per area, compared with the membrane of Comparative Example 4.

Evaluation Example 3: Weight and Radius of Curvature of Membrane

A weight and a radius of curvature of each of the composite membranes of Examples 1 to 3 and the membranes of Comparative Examples 1 to 3 were evaluated according to the following method.

The radius of curvature was measured as a radius of a circle formed by bending a membrane, using a cylindrical mandrel bend tester (available from Sheen Instruments) to bend each membrane according to ISO 1519, and by positive bending in this test.

The results of the radius of curvature measurements are shown in Table 2.

TABLE 2

| Example | Weight (mg/cm$^2$) | Radius of curvature (mm) |
|---|---|---|
| Example 1 | 10.2 | 2 |
| Example 2 | 7.3 | 2 |
| Example 3 | 6.4 | 2 |
| Comparative Example 1 | 3.1 | 2 |
| Comparative Example 2 | 3.7 | 2 |
| Comparative Example 3 | 88 | >32 |

Referring to FIG. 2, the composite membranes of Examples 1 to 3 were found to have good flexibility.

Evaluation Example 4: Resistance

1) Examples 4 and 5 and Comparative Example 5

Resistance characteristics of the battery assemblies of Examples 4 and 5 and Comparative Example 5 were evaluated. The results are shown in FIG. 6A.

Figure 6A:
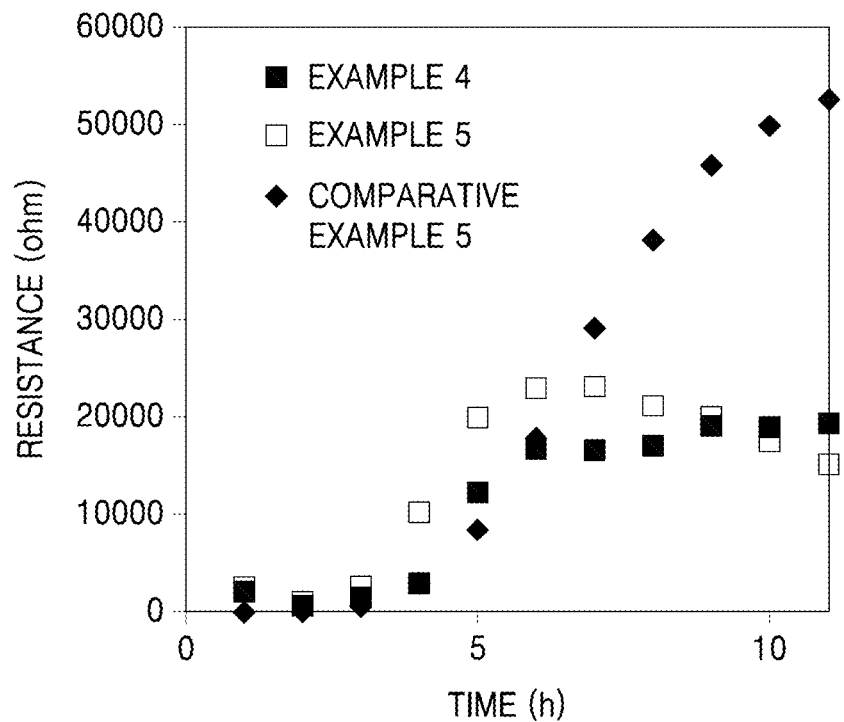
FIG. 6A is a graph of resistance (ohms) versus time (hours; h) illustrating the resistance characteristics of the battery assemblies of Examples 4 and 5 and Comparative Example 5.

Referring to FIG. 6A, the battery assemblies of Examples 4 and 5 were found to have improved resistance characteristics as compared with the battery assembly of Comparative Example 5.

2) Example 6 and Comparative Example 6

Resistance characteristics of the battery assemblies of Example 6 and Comparative Example 6 were evaluated. The results are shown in FIG. 6B.

Figure 6B:
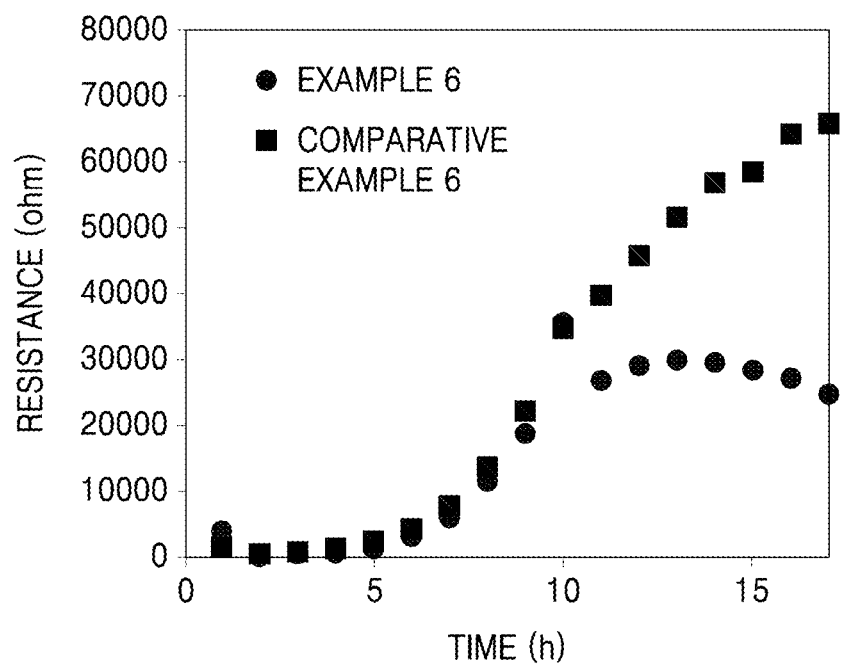
FIG. 6B is a graph of resistance (ohms) versus time (h) illustrating the resistance characteristics of the battery assemblies of Example 6 and Comparative Example 6.

Referring to FIG. 6B, the battery assembly of Example 6 was found to have improved resistance characteristics as compared with the battery assembly of Comparative Example 6.

Evaluation Example 4: Oxygen Permeability Analysis

1) Examples 1 and 2 and Comparative Example 1

Oxygen permeability of each of the composite membranes of Examples 1 and 2 and the ion conductive layer of Comparative Example 1 were evaluated according to the following method.

Sample discs each having an area of 1 cm$^2$ was used for an oxygen permeation test using an oxygen transmission rate tester (OX-TRAN 2/21 ML, available from MOCON Inc.).

As a result of the oxygen permeation test, the composite membranes of Examples 1 and 2 were found to have improved oxygen blocking characteristics as compared with the ion conductive layer of Comparative Example 1.

Evaluation Example 5: Cycle Characteristics of Lithium Air Battery

The lithium air batteries of Example 7 and Comparative Example 7 were placed in a chamber at about 60° C. in an oxygen atmosphere. Each lithium air battery was discharged in a constant current (CC) mode (0.24 milliamperes per square centimeter (mA/cm$^2$)) at an oxygen pressure of 1 atm and charged in a constant voltage (CV) mode (4.3 V).

A charge-discharge capacity of each of the lithium air batteries was set to about 200 milliampere hours per gram of carbon (mAh/g$_{carbon}$). Cycle characteristics of the lithium air batteries were evaluated.

As a result, the lithium air battery of Example 7 was found to have improved cycle characteristics as compared with the lithium air battery of Comparative Example 7.

As described above, according to the one or more example embodiments, a composite membrane including a non-continuously aligned structure of gas blocking inorganic particles in an ion-conductive polymer layer may have improved ion conductivity, flexibility, and gas blocking ability, and may be formed with a large size. A lithium air battery having improved cell performance may be manufactured by using the composite membrane.

It should be understood that example embodiments described herein should be considered in a descriptive sense only and not for purposes of limitation. Descriptions of features or aspects within each example embodiment should typically be considered as available for other similar features or aspects in other embodiments.

While one or more example embodiments have been described with reference to the figures, it will be understood by those of ordinary skill in the art that various changes in form and details may be made therein without departing from the spirit and scope as defined by the following claims.

What is claimed is:

1. A composite membrane comprising:
   an ion-conductive polymer layer; and
   a plurality of gas blocking inorganic particles non-continuously disposed on and contacting the ion-conductive polymer layer such that the gas blocking inorganic particles do not extend from a first surface to an opposite second surface of the ion-conductive polymer layer,
   wherein the composite membrane has a radius of curvature of about 10 millimeters or less, and
   wherein a gas blocking inorganic particle of the plurality of gas blocking inorganic particles includes a hydrophobic coating layer on a surface thereof.

2. The composite membrane of claim 1, wherein the radius of curvature is about 2 millimeters to about 5 millimeters.

3. The composite membrane of claim 1, wherein the plurality of gas blocking inorganic particles are arranged as a monolayer on the ion-conductive polymer layer.

4. The composite membrane of claim 3, wherein the hydrophobic coating layer comprises a condensation reaction product of at least one selected from compounds represented by Formula 1:

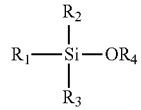

Formula 1 wherein, in Formula 1,
   R$_1$ to R$_3$ are each independently selected from a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C7-C20 arylalkyl group, a substituted or unsubstituted C6-C20 aryloxy group, a substituted or unsubstituted C2-C20 heteroaryl group, a substituted or unsubstituted C2-C20 heteroaryloxy group, a substituted or unsubstituted C3-C20 heteroarylalkyl group, a substituted or unsubstituted C2-C20 heterocyclic group, and a halogen atom; and
   R$_4$ is selected from hydrogen, a substituted or unsubstituted C1-C20 alkyl group, and a substituted or unsubstituted C6-C20 aryl group, and
   wherein at least one hydrogen atom of the substituted C1-C20 alkyl group, the substituted C1-C20 alkoxy group, the substituted C2-C20 alkenyl group, the substituted C2-C20 alkynyl group, the substituted C6-C20 aryl group, the substituted C7-C20 arylalkyl group, the substituted C6-C20 aryloxy group, the substituted C2-C20 heteroaryl group, the substituted C2-C20 heteroaryloxy group, the substituted C3-C20 heteroarylalkyl group, the substituted C2-C20 heterocyclic group is a halogen atom, a C1-C20 alkyl group substituted with a halogen atom, a C1-C20 alkoxy group, a C2-C20 alkoxyalkyl group, a hydroxyl group, a nitro group, a cyano group, an amino group, an amidino group, a hydrazine group, a hydrazone group, a carboxyl group or a salt thereof, a sulfonyl group, a sulfamoyl group, a sulfonic acid group or a salt thereof, a phosphoric acid group or a salt thereof, a C1-C20 alkyl group, a C2-C20 alkenyl group, a C2-C20 alkynyl group, a C1-C20 heteroalkyl group, a C6-C20 aryl group, a C7-C20 arylalkyl group, a C6-C20 heteroaryl group, a C7-C20 heteroarylalkyl group, a C6-C20 heteroaryloxy group, a C7-C20 heteroaryloxyalkyl group, or a C7-C20 heteroarylalkyl group.

5. The composite membrane of claim 4, wherein the at least one selected from compounds represented by Formula 1 comprises at least one compound selected from isobutyltrimethoxysilane, octyltrimethoxysilane, propyltrimethoxysilane, decyltrimethoxysilane, dodecyltrimethoxysilane, octadecyltrimethoxysilane, 3-methacryloxypropyltrimethoxysilane, n-octadecyltriethoxysilane, 1H, 1H,2H, 2H-perfluorooctyltriethoxysilane, and (3-mercaptopropyl)trimethoxysilane.

6. The composite membrane of claim 4, wherein an amount of the condensation reaction product of the at least one selected from compounds represented by Formula 1 is from about 0.1 parts to about 30 parts by weight, based on 100 parts by weight of the plurality of gas blocking inorganic particles.

7. The composite membrane of claim 1, wherein an amount of the plurality of gas blocking inorganic particles is from about 10 parts to about 90 parts by weight, based on 100 parts by weight of a total weight of the composite membrane, and
   wherein the gas blocking inorganic particles in the composite membrane occupy about 70% or greater of a total area of the composite membrane.

8. The composite membrane of claim 1, wherein the plurality of gas blocking inorganic particles comprises at least one selected from a glassy active metal ionic conductor, an amorphous active metal ionic conductor, a ceramic active metal ionic conductor, and a glass-ceramic active metal ionic conductor.

9. The composite membrane of claim 1, wherein the plurality of gas blocking inorganic particles comprises at least one selected from $Li_{1+x+y}Al_xTi_{2-x}Si_yP_{3-y}O_{12}$ wherein $0<x<2$ and $0\le y<3$, $BaTiO_3$, $Pb(Zr_rTi_{1-r})O_3$ wherein $0\le r\le 1$, $Pb_{1-x}La_xZr_{1-y}Ti_yO_3$ wherein $0\le x<1$ and $0\le y<1$, $Pb(Mg_3Nb_{2/3})O_3$—$PbTiO_3$, $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $SiC$, $Li_3PO_4$, $Li_xTi_y(PO_4)_3$ wherein $0<x<2$ and $0<y<3$, $Li_xAl_yTi_z(PO_4)_3$ wherein $0<x<2$ and $0<y<1$ and $0<z<3$, $Li_{1+x+y}(Al_qGa_{1-q})_x(Ti_h,Ge_{1-h})_{2-x}Si_yP_{3-y}O_{12}$ wherein $0\le q\le 1$ and $0\le h\le 1$ and $0\le x\le 1$ and $0\le y\le 1$, $Li_xLa_yTiO_3$ wherein $0<x<2$ and $0<y<3$, $Li_xGe_yP_zS_w$ wherein $0<x<4$ and $0<y<1$ and $0<z<1$ and $0<w<5$, $Li_xN_y$ wherein $0<x<4$ and $0<y<2$, $Li_xSi_yS_z$ wherein $0\le x<3$ and $0<y<2$ and $0<z<4$, $Li_xP_yS_z$ wherein $0\le x<3$ and $0<y<3$ and $0<z<7$, $Li_2O$, $LiF$, $LiOH$, $Li_2CO_3$, $LiAlO_2$, $Li_2O$-$Al_2O_3$—$SiO_2$—$P_2O_5$—$TiO_2$—$GeO_2$, and $Li_{3+x}La_3M_2O_{12}$ wherein M is Te, Nb, or Zr, and x is an integer from 1 to 10.

10. The composite membrane of claim 1, wherein the ion-conductive polymer layer comprises at least one selected from polyethylene oxide, polyvinylidene fluoride, polyvinylpyrrolidone, polyvinyl alcohol, poly 2-vinylpyridine, polytetrafluoroethylene, a tetrafluoroethylene-hexafluoropropylene copolymer, polychlorotrifluoroethylene, a perfluoroalkoxy copolymer, a fluorinated cyclic ether, polyethylene oxide diacrylate, polyethylene oxide dimethacrylate, polypropylene oxide diacrylate, polypropylene oxide dimethacrylate, polymethyleneoxide diacrylate, polymethyleneoxide dimethacrylate, poly(C1-C4 alkyl)diol diacrylate, poly(C1-C4 alkyl)diol dimethacrylate, polydivinylbenzene, polyether, polycarbonate, polyamide, polyester, polyvinyl chloride, polyimide, polycarboxylic acid, polysulfonic acid, polysulfone, polystyrene, polyethylene, polypropylene, poly(p-phenylene), polyacetylene, poly(p-phenylene vinylene), polyaniline, polypyrrole, polythiophene, polyacene, poly(naphthalene-2,6-diyl), polypropylene oxide, a vinylidene fluoride-hexafluoropropylene copolymer, poly(vinyl acetate), poly(vinyl butyral-co-vinyl alcohol-co-vinyl acetate), poly(methyl methacrylate-co-ethyl acrylate), polyacrylonitrile, poly(vinyl chloride-co-vinyl acetate), poly(1-vinyl pyrrolidone-co-vinyl acetate), polyacrylate, polymethacrylate, polyurethane, polyvinyl ether, an acrylonitrile-butadiene rubber, a styrene-butadiene rubber, an acrylonitrile-butadiene-styrene rubber, a sulfonated styrene/ethylene-butylene triblock copolymer, epoxide resin, and a polymer obtained from at least one acrylate monomer selected from ethoxylated neopentyl glycol diacrylate, ethoxylated bisphenol A diacrylate, a C10-C30 alkyl acrylate, ethoxylated aliphatic urethane acrylate, and ethoxylated (C1-C20 alkyl)phenol acrylate.

11. The composite membrane of claim 1, wherein the composite membrane further comprises at least one selected from an ionic liquid, a lithium salt, and a polymeric ionic liquid.

12. The composite membrane of claim 11, wherein the lithium salt comprises at least one selected from $LiPF_6$, $LiBF_4$, $LiSbF_6$, $LiAsF_6$, $LiN(SO_2C_2F_5)_2$, $Li(CF_3SO_2)_2N$, $Li(FSO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ wherein x and y are positive integers, $LiF$, $LiBr$, $LiCl$, $LiOH$, $LiI$, and $LiB(C_2O_4)_2$,
   wherein the ionic liquid comprises at least one selected from N, N-diethyl-N-methyl-N-(2-methoxyethyl)ammonium bis(trifluoromethanesulfonyl)imide, N-methyl-N-propylpyrrolidinium bis(trifluoromethanesulfonyl)imide, N-butyl-N-methylpyrrolidinium bis (3-trifluoromethanesulfonyl)imide, 1-butyl-3-methylimidazolium bis(trifluoromethanesulfonyl)imide, and 1-ethyl-3-methylimidazolium bis(trifluoromethanesulfonyl)imide, and wherein the polymeric ionic liquid comprises at least one selected from poly(diallyldimethylammonium) trifluoromethanesulfonylimide, poly(1-methacryloyloxy propyl-3-methylimidazolium) bis(trifluoromethanesulfonesulfonyl imide), and poly(1-vinyl-3-ethylimidazolium) bis(trifluoromethanesulfonesulfonyl imide).

13. The composite membrane of claim 1, wherein the ion-conductive polymer layer comprises polyvinylidene fluoride, N,N-diethyl-N-methyl-N-(2-methoxyethyl)ammonium bis(trifluoromethanesulfonyl)imide, and lithium bis(trifluoromethylsulfonyl)imide, and the plurality of gas blocking inorganic particles comprises $SiO_2$, and $Li_{1+x+y}Al_xTi_{2-x}Si_yP_{3-y}O_{12}$ wherein $0<x<2$ and $0 \leq y<3$; or the composite membrane further comprises a porous layer, the ion-conductive polymer layer comprises poly(diallyldimethylammonium) bis(trifluoromethanesulfonyl)imide, N, N-diethyl-N-methyl-N-(2-methoxyethyl)ammonium bis(trifluoromethanesulfonyl)imide, and lithium bis(trifluoromethanesulfonyl)imide, the plurality of gas blocking inorganic particles comprises $SiO_2$ and $Li_{1+x+y}Al_xTi_{2-x}Si_yP_{3-y}O_{12}$ wherein $0<x<2$ and $0 \leq y<3$, and the ion-conductive polymer layer and the plurality of gas blocking inorganic particles are disposed on the porous layer;

the ion-conductive polymer layer comprises polyvinylidene fluoride, N, N-diethyl-N-methyl-N-(2-methoxyethyl)ammonium bis(trifluoromethanesulfonyl)imide, and lithium bis(trifluoromethylsulfonyl)imide, the plurality of gas blocking inorganic particles comprises $SiO_2$ and $Li_{1+x+y}Al_xTi_{2-x}Si_yP_{3-y}O_{12}$ wherein $0<x<2$ and $0 \leq y<3$, and at least a portion of the plurality of gas blocking inorganic particles has a hydrophobic coating layer disposed on a surface thereof; or the composite membrane further comprises a porous layer, the ion-conductive polymer layer comprises poly(diallyldimethylammonium) bis(trifluoromethanesulfonyl)imide, N, N-diethyl-N-methyl-N-(2-methoxyethyl)ammonium bis(trifluoromethanesulfonyl)imide, and lithium bis(trifluoromethanesulfonyl)imide, the plurality of gas blocking inorganic particles comprises $SiO_2$ and $Li_{1+x+y}Al_xTi_{2-x}Si_yP_{3-y}O_{12}$ wherein $0<x<2$ and $0 \leq y<3$, at least a portion of the plurality of gas blocking inorganic particles has a hydrophobic coating layer disposed on a surface thereof, and the ion-conductive polymer layer and the plurality of gas blocking inorganic particles are disposed on the porous layer.

14. The composite membrane of claim 1, wherein the composite membrane further comprises a porous layer.

15. The composite membrane of claim 1, wherein the plurality of gas blocking inorganic particles have an average particle diameter of about 1 micrometer to about 300 micrometers, and the plurality of gas blocking inorganic particles in the composite membrane occupy about 70% or greater of a total area of the composite membrane.

16. The composite membrane of claim 1, wherein the gas blocking inorganic particles are aligned in substantially a same direction as at least one of the first surface of the ion-conductive polymer layer or the second surface of the ion-conductive polymer layer.

17. The composite membrane of claim 1, wherein the gas blocking inorganic particles extend across the first surface and do not contact the opposite second surface of the ion-conductive polymer layer.

18. The composite membrane of claim 1, wherein the gas blocking inorganic particles are within the ion-conductive polymer layer and do not contact the first surface or the opposite second surface of the ion-conductive polymer layer.

19. A method of preparing the composite membrane of claim 1, the method comprising:

preparing a composition comprising an ion-conductive polymer and an organic solvent;

disposing the composition onto a porous layer;

applying the plurality of gas blocking inorganic particles to the composition; and drying the gas blocking inorganic particles and the composition to prepare the composite membrane, wherein the composite membrane comprises the ion-conductive polymer layer, and the plurality of gas blocking inorganic particles non-continuously disposed on and contacting the ion-conductive polymer layer such that the gas blocking inorganic particles do not extend from the first surface to the opposite second surface of the ion-conductive polymer layer, and wherein the gas blocking inorganic particle of the plurality of gas blocking inorganic particles includes the hydrophobic coating layer on a surface thereof.

20. The method of claim 19, further comprising adding at least one selected from an ionic liquid, a polymeric ionic liquid, and a lithium salt to the composition.

21. A lithium air battery comprising: an anode; a cathode; and the composite membrane of claim 1 between the anode and the cathode, wherein the plurality of gas blocking inorganic particles are non-continuously aligned in a region of the composite membrane adjacent to the cathode, and wherein the gas blocking inorganic particle of the plurality of gas blocking inorganic particles includes the hydrophobic coating layer on a surface thereof.

22. The lithium air battery of claim 18, wherein the plurality of gas blocking inorganic particles are non-continuously aligned in a region of the composite membrane adjacent to the cathode.

23. A battery assembly comprising:

an electrolyte;

a lithium metal or a lithium metal alloy; and the composite membrane of claim 1.

24. The battery assembly of claim 23, wherein the electrolyte is a polymer solid electrolyte.

25. A composite membrane comprising:

an ion-conductive polymer layer; and a plurality of gas blocking inorganic particles non-continuously disposed on and contacting the ion-conductive polymer layer such that the gas blocking inorganic particles do not extend from a first surface to an opposite second surface of the ion-conductive polymer layer, wherein the composite membrane has a radius of curvature of about 10 millimeters or less, and wherein the plurality of gas blocking inorganic particles have an average particle diameter of about 1 micrometer to about 300 micrometers, and the plurality of gas blocking inorganic particles in the composite membrane occupy about 70% or greater of a total area of the composite membrane.

* * * * *